(12) United States Patent
Wilson et al.

(10) Patent No.: US 8,847,739 B2
(45) Date of Patent: Sep. 30, 2014

(54) FUSING RFID AND VISION FOR SURFACE OBJECT TRACKING

(75) Inventors: Andrew D. Wilson, Seattle, WA (US); Alex Olwal, Stockholm (SE)

(73) Assignee: Microsoft Corporation, Redmond, WA (US)

( * ) Notice: Subject to any disclaimer, the term of this patent is extended or adjusted under 35 U.S.C. 154(b) by 810 days.

(21) Appl. No.: 12/185,174

(22) Filed: Aug. 4, 2008

(65) Prior Publication Data

US 2010/0026470 A1 Feb. 4, 2010

(51) Int. Cl.
| | |
|---|---|
| *H04Q 5/22* | (2006.01) |
| *G08B 13/14* | (2006.01) |
| *G06F 3/041* | (2006.01) |
| *G09G 5/00* | (2006.01) |
| *G09G 5/08* | (2006.01) |
| *G06F 3/033* | (2013.01) |
| *G06F 3/048* | (2013.01) |
| *G06K 9/32* | (2006.01) |
| *G06K 9/62* | (2006.01) |
| *G06F 3/046* | (2006.01) |

(52) U.S. Cl.
CPC *G06F 3/046* (2013.01); *G06K 9/32* (2013.01); *G06K 9/6288* (2013.01); *H04Q 2213/13095* (2013.01)
USPC ............ 340/10.52; 340/10.1; 340/572.1; 345/173; 345/168; 345/157; 715/863; 715/763; 715/773

(58) Field of Classification Search
CPC ......... G06F 3/011; G06F 3/016; G06F 3/017; G06F 3/02; G06F 3/048; G06F 2015/00; G06F 2003/0691; G06F 2206/20; G06F 1/022; G06F 3/046; G06K 7/00; G06K 7/0095; G06K 7/10821; G06K 9/00006; G06K 9/00154; G06K 9/00402; G06K 9/00496; G06K 9/00442; G06K 9/00161; G06K 9/00107; G06K 9/00033; G06K 9/00046; G06K 9/0004; G06K 9/02; G06K 5/00
USPC .................. 715/863; 345/173, 179, 158, 156; 340/572.3, 572.7, 539.26, 666, 584, 340/593, 594, 601, 602, 689, 572.1, 572.4, 340/572.5, 988, 10.1, 10.2, 10.3, 10.31, 340/10.4, 10.41, 10.42, 825.69, 825.71, 340/825.73, 825.31, 825.72, 539, 825.32, 340/10.5, 5.61, 5.72
See application file for complete search history.

(56) References Cited

U.S. PATENT DOCUMENTS

| | | | |
|---|---|---|---|
| 5,227,985 A | 7/1993 | DeMenthon | |
| 5,252,951 A | 10/1993 | Tannenbaum et al. | |
| 5,317,140 A | 5/1994 | Dunthorn | |
| 5,459,489 A | 10/1995 | Redford | |
| 5,594,469 A | 1/1997 | Freeman et al. | |
| 5,753,931 A | 5/1998 | Borchers et al. | |
| 5,828,369 A | 10/1998 | Foster | |
| 5,943,476 A | 8/1999 | Dougherty et al. | |
| 6,057,845 A | 5/2000 | Dupouy | |
| 6,115,028 A * | 9/2000 | Balakrishnan et al. | 345/157 |
| 6,128,003 A | 10/2000 | Smith et al. | |
| 6,151,595 A | 11/2000 | Pirolli et al. | |
| 6,181,343 B1 | 1/2001 | Lyons | |
| 6,195,104 B1 | 2/2001 | Lyons | |
| 6,249,606 B1 | 6/2001 | Kiraly et al. | |
| 6,269,172 B1 | 7/2001 | Rehg et al. | |
| 6,327,346 B1 | 12/2001 | Infosino | |
| 6,404,506 B1 | 6/2002 | Cheng et al. | |
| 6,469,633 B1 | 10/2002 | Wachter | |
| 6,499,026 B1 | 12/2002 | Rivette et al. | |
| 6,600,475 B2 | 7/2003 | Gutta et al. | |
| 6,624,833 B1 | 9/2003 | Kumar et al. | |
| 6,710,770 B2 | 3/2004 | Tomasi et al. | |
| 6,788,809 B1 | 9/2004 | Grzeszczuk et al. | |
| 6,804,396 B2 | 10/2004 | Higaki et al. | |
| 6,850,252 B1 | 2/2005 | Hoffberg | |
| 6,856,470 B2 | 2/2005 | Nishimura | |
| 6,888,960 B2 | 5/2005 | Penev et al. | |
| 6,907,581 B2 | 6/2005 | Noy et al. | |
| 6,920,619 B1 | 7/2005 | Milekic | |
| 6,970,098 B1 | 11/2005 | Adams et al. | |
| 6,982,697 B2 | 1/2006 | Wilson et al. | |
| 6,990,639 B2 | 1/2006 | Wilson | |

| | | |
|---|---|---|
| 6,998,987 B2 | 2/2006 | Lin |
| 7,000,200 B1 | 2/2006 | Martins |
| 7,007,236 B2 | 2/2006 | Dempski et al. |
| 7,038,661 B2 | 5/2006 | Wilson et al. |
| 7,068,842 B2 | 6/2006 | Liang et al. |
| 7,095,401 B2 | 8/2006 | Liu et al. |
| 7,096,454 B2 | 8/2006 | Damm et al. |
| 7,123,770 B2 | 10/2006 | Raghupathy et al. |
| 7,180,500 B2 | 2/2007 | Marvit et al. |
| 7,200,639 B1 | 4/2007 | Yoshida |
| 7,202,791 B2 | 4/2007 | Trajkovic |
| 7,301,526 B2 | 11/2007 | Marvit et al. |
| 7,307,661 B2 | 12/2007 | Lieberman et al. |
| 7,309,829 B1 | 12/2007 | Ludwig |
| 7,333,090 B2 | 2/2008 | Tanaka et al. |
| 7,355,632 B2 | 4/2008 | Shiiyama |
| 7,365,736 B2 | 4/2008 | Marvit et al. |
| 7,369,048 B2 | 5/2008 | Freund |
| 7,372,977 B2 | 5/2008 | Fujimura et al. |
| 7,372,993 B2 | 5/2008 | Lagardere et al. |
| 7,427,980 B1 | 9/2008 | Partridge et al. |
| 7,564,369 B1 | 7/2009 | Adams et al. |
| 7,565,295 B1 | 7/2009 | Hernandez-Rebollar |
| 7,577,655 B2 | 8/2009 | Curtiss et al. |
| 7,584,099 B2 | 9/2009 | Ma et al. |
| 7,627,834 B2 | 12/2009 | Rimas-Ribikauskas et al. |
| 7,697,960 B2 | 4/2010 | Seo et al. |
| 7,870,496 B1 | 1/2011 | Sherwani |
| 7,904,913 B2 | 3/2011 | Sim-Tang et al. |
| 7,970,176 B2 | 6/2011 | Kutliroff et al. |
| 8,147,248 B2 | 4/2012 | Rimas-Ribikauskas et al. |
| 8,165,422 B2 | 4/2012 | Wilson |
| 8,182,267 B2 | 5/2012 | Katz et al. |
| 8,194,921 B2 | 6/2012 | Kongqiao et al. |
| 8,214,387 B2 | 7/2012 | King et al. |
| 2002/0034280 A1 | 3/2002 | Infosino |
| 2002/0036617 A1 | 3/2002 | Pryor |
| 2002/0061217 A1 | 5/2002 | Hillman et al. |
| 2002/0118880 A1 | 8/2002 | Liu et al. |
| 2003/0059081 A1 | 3/2003 | Trajkovic |
| 2003/0067537 A1 | 4/2003 | Myers |
| 2003/0156756 A1 | 8/2003 | Gokturk et al. |
| 2003/0193572 A1 | 10/2003 | Wilson et al. |
| 2004/0001113 A1 | 1/2004 | Zipperer et al. |
| 2004/0155902 A1 | 8/2004 | Dempski et al. |
| 2004/0174542 A1 | 9/2004 | Handman et al. |
| 2004/0189720 A1 | 9/2004 | Wilson et al. |
| 2004/0193441 A1 | 9/2004 | Altieri |
| 2004/0233172 A1* | 11/2004 | Schneider et al. ............ 345/168 |
| 2005/0089204 A1 | 4/2005 | Carver et al. |
| 2005/0151850 A1 | 7/2005 | Ahn et al. |
| 2005/0181347 A1 | 8/2005 | Barnes et al. |
| 2005/0210417 A1 | 9/2005 | Marvit et al. |
| 2005/0212751 A1 | 9/2005 | Marvit et al. |
| 2005/0212753 A1 | 9/2005 | Marvit et al. |
| 2005/0238201 A1 | 10/2005 | Shamaie |
| 2005/0255434 A1 | 11/2005 | Lok et al. |
| 2005/0281475 A1 | 12/2005 | Wilson |
| 2006/0001650 A1 | 1/2006 | Robbins et al. |
| 2006/0007142 A1 | 1/2006 | Wilson et al. |
| 2006/0010400 A1 | 1/2006 | Dehlin et al. |
| 2006/0026521 A1 | 2/2006 | Hotelling et al. |
| 2006/0026536 A1* | 2/2006 | Hotelling et al. ............ 715/863 |
| 2006/0027658 A1 | 2/2006 | Genc et al. |
| 2006/0031786 A1 | 2/2006 | Hillis et al. |
| 2006/0036944 A1 | 2/2006 | Wilson |
| 2006/0041590 A1 | 2/2006 | King et al. |
| 2006/0055684 A1 | 3/2006 | Rimas-Ribikauskas et al. |
| 2006/0061545 A1 | 3/2006 | Hughes et al. |
| 2006/0061814 A1 | 3/2006 | Tokunaga |
| 2006/0092267 A1 | 5/2006 | Dempski et al. |
| 2006/0097991 A1* | 5/2006 | Hotelling et al. ............ 345/173 |
| 2006/0101384 A1 | 5/2006 | Sim-Tang et al. |
| 2006/0125799 A1 | 6/2006 | Hillis et al. |
| 2006/0125803 A1* | 6/2006 | Westerman et al. ......... 345/173 |
| 2006/0128460 A1 | 6/2006 | Muir et al. |
| 2006/0178212 A1 | 8/2006 | Penzias |
| 2006/0210958 A1 | 9/2006 | Rimas-Ribikauskas et al. |
| 2006/0223635 A1 | 10/2006 | Rosenberg |
| 2006/0229862 A1 | 10/2006 | Ma et al. |
| 2006/0244719 A1 | 11/2006 | Brigham et al. |
| 2006/0250213 A1 | 11/2006 | Cain et al. |
| 2006/0256081 A1 | 11/2006 | Zalewski et al. |
| 2006/0267966 A1 | 11/2006 | Grossman et al. |
| 2007/0057793 A1* | 3/2007 | Alden ..................... 340/572.1 |
| 2007/0063991 A1* | 3/2007 | Lee et al. .................... 345/173 |
| 2007/0082710 A1 | 4/2007 | Jang |
| 2007/0109808 A1 | 5/2007 | Hobden et al. |
| 2007/0177803 A1* | 8/2007 | Elias et al. .................. 382/188 |
| 2007/0182818 A1 | 8/2007 | Buehler |
| 2007/0192739 A1 | 8/2007 | Hunleth et al. |
| 2007/0223015 A1* | 9/2007 | Lapstun et al. ............... 358/1.6 |
| 2007/0238491 A1 | 10/2007 | He |
| 2007/0251521 A1* | 11/2007 | Schackmuth et al. ........ 126/369 |
| 2007/0252898 A1 | 11/2007 | Delean |
| 2007/0283263 A1 | 12/2007 | Zawde et al. |
| 2007/0283296 A1 | 12/2007 | Nilsson |
| 2008/0005703 A1 | 1/2008 | Radivojevic et al. |
| 2008/0028321 A1 | 1/2008 | Weksler et al. |
| 2008/0029691 A1 | 2/2008 | Han |
| 2008/0036732 A1 | 2/2008 | Wilson et al. |
| 2008/0036743 A1* | 2/2008 | Westerman et al. .......... 345/173 |
| 2008/0042978 A1 | 2/2008 | Perez-Noguera |
| 2008/0094370 A1 | 4/2008 | Ording et al. |
| 2008/0122786 A1 | 5/2008 | Pryor et al. |
| 2008/0167960 A1 | 7/2008 | Hughes |
| 2008/0168403 A1 | 7/2008 | Westerman et al. |
| 2008/0170776 A1 | 7/2008 | Albertson et al. |
| 2008/0178126 A1* | 7/2008 | Beeck et al. .................. 715/863 |
| 2008/0179507 A2 | 7/2008 | Han |
| 2008/0191864 A1 | 8/2008 | Wolfson |
| 2008/0193043 A1 | 8/2008 | Wilson |
| 2008/0244468 A1 | 10/2008 | Nishihara et al. |
| 2008/0250314 A1 | 10/2008 | Larsen |
| 2008/0252596 A1 | 10/2008 | Bell et al. |
| 2008/0254426 A1 | 10/2008 | Cohen |
| 2009/0049089 A1 | 2/2009 | Adachi et al. |
| 2009/0121894 A1 | 5/2009 | Wilson et al. |
| 2009/0257649 A1 | 10/2009 | Yamauchi et al. |
| 2009/0278799 A1 | 11/2009 | Wilson |
| 2009/0278806 A1 | 11/2009 | Duarte et al. |
| 2009/0306983 A1 | 12/2009 | Bhandari |
| 2009/0307623 A1 | 12/2009 | Agarawala et al. |
| 2009/0324008 A1 | 12/2009 | Kongqiao et al. |
| 2010/0031202 A1 | 2/2010 | Morris et al. |
| 2010/0103269 A1 | 4/2010 | Wilson et al. |
| 2010/0207874 A1 | 8/2010 | Yuxin et al. |
| 2011/0019056 A1 | 1/2011 | Hirsch et al. |
| 2011/0137900 A1 | 6/2011 | Chang et al. |
| 2011/0263946 A1 | 10/2011 | el Kaliouby et al. |
| 2011/0282785 A1 | 11/2011 | Chin |
| 2012/0150651 A1 | 6/2012 | Hoffberg et al. |

FOREIGN PATENT DOCUMENTS

| | | |
|---|---|---|
| EP | 1653391 A2 | 5/2006 |
| JP | 8506193 A | 7/1996 |
| JP | 2001109579 A | 4/2001 |
| JP | 2001159865 A | 6/2001 |
| JP | 2002251235 A | 9/2002 |
| JP | 2003005913 A | 1/2003 |
| JP | 2003281652 A | 10/2003 |
| JP | 2006163751 A | 6/2006 |
| JP | 2006518076 A | 8/2006 |
| JP | 2009525538 A | 7/2009 |
| WO | WO03/063069 A2 | 7/2001 |
| WO | WO0216865 A2 | 2/2002 |
| WO | WO03063069 A2 | 7/2003 |
| WO | WO2004072843 A1 | 8/2004 |
| WO | WO2005064275 A1 | 7/2005 |
| WO | WO2005087460 A1 | 9/2005 |
| WO | WO2005114369 A2 | 12/2005 |
| WO | W2007029038 A1 | 3/2007 |
| WO | WO2007089766 A2 | 8/2007 |

OTHER PUBLICATIONS

Boukraa, et al. Tag-Based Vision: Assisting 3D Scene Analysis with Radio-Frequency Tags. In: Image Processing 2002 (2002), 1-269-1-2722, pp. 412-418. http://www.isif.org/fusion02CD/pdffiles/papers/M3D02.pdf. Last accessed Jun. 26, 2008, 7 pages.

Dietz, et al. DiamondTouch: A Multi-User Touch Technology, TR2003-125 Oct. 2003. http://www.merl.com/papers/docs/TR2003-125.pdf.

Fishkin, et al. I Sense a Disturbance in the Force: Unobtrusive Detection of Interactions with RFID-tagged Objects. IRS-TR-04-013, Jun. 2004. http://www.intel-research.net/seattle/pubs/062420041544_244.pdf. Last accessed Jun. 26, 2008, 17 pages.

Ishii, et al. Tangible Bits: Towards Seamless Interfaces between People, Bits and Atoms. In: Proceedings of CHI '97, Mar. 22-27, 1997. http://citeseer.ist.psu.edu/cache/papers/cs/11158/http:zSzzSztangible.media.mit.eduzSzgroupszSztangiblezSzpaperszSzTangible_Bits_CHI97zSzTangible_Bits_CHI97.pdf/ishii97tangible.pdf. Last accessed Jun. 27, 2008, 8 pages.

Olwal. LightSense: Enabling Spatially Aware Handheld Interaction Devices. In : Proceedings of ISMAR 2006 (IEEE and ACM International Symposium on Mixed and Augmented Reality), Santa Barbara, CA, Oct. 22-25, 2006, pp. 119-122. http://www.csc.kth.se/~alx/projects/research/lightsense/olwal_lightsense_ismar_2006.pdf. Last accessed Jun. 27, 2008, 4 pages.

Patten, et al. Sensetable: A Wireless Object Tracking Platform for Tangible User Interfaces. In: Proceedings of CHI 2001, Mar. 31-Apr. 5, 2001. http://tangible.media.mitedu/content/papers/pdf/SenseTable_CHI01.pdf. Last accessed Jun. 27, 2008, 8 pages.

Rahimi, et al. Estimating Observation Functions in Dynamical Systems using Unsupervised Regression, Sep. 19, 2006, NIPS (2006). http://www.intel-research.net/seattle/pubs/100920061513_363.pdf. Last accessed Jun. 27, 2008, 9 pages.

Rekimoto, et al. Augmented Surfaces: A Spatially Continuous Work Space for Hybrid Computing Environments. In: Proc. ACM CHI '99, Pittsburgh, PA, May 15-20, 1999. http://citeseer.ist.psu.edu/cache/papers/cs/26586/http:zSzzSzwww.csl.sony.co.jpzSzpersonzSzrekimotozSzpaperszSzchi99.pdf/rekimoto99augmented.pdf. Last accessed Jun. 27, 2008, 8 pages.

Rekimoto, et al. DataTiles: A Modular Platform for Mixed Physical and Graphical Interactions. In : SIGCHI'01, Mar. 31-Apr. 4, 2001, Seattle, WA, USA. ACM 1-58113-327-08/01/0003. http://citeseer.ist.psu.edu/cache/papers/cs/23615/http:zSzzSzwww.media.mit.eduzSz~ullmerzSzpaperszSzdatatiles-chi01.pdf/rekimoto01datatiles.pdf. Last accessed Jun. 27, 2008, 8 pages.

Ullmer, et al. Tangible Query Interfaces: Physically Constrained Tokens for Manipulating Database Queries. In: INTERACT'03. http://citeseer.ist.psu.edu/cache/papers/cs/27286/http:zSzzSzwww.cs.tufts.eduzSz~jacobzSzpaperszSzinteract03.pdf/ullmer03tangible.pdf. Last accessed Jun. 27, 2008, 8 pages.

Ullmer, et al. The metaDESK: Models and Prototypes for Tangible User Interfaces. In: Proceedings of UIST '97, Oct. 14-17, 1997. ACM 0-89791-881-9/97/10. http://citeseer.ist.psu.edu/cache/papers/cs/11158/http:zSzzSztangible.media.mit.eduzSzgroupszSztangiblezSzpaperszSzmetaDESK_UIST97zSzmetaDESK_UIST97.pdf/ullmer97metadesk.pdf. Last accessed Jun. 27, 2008, 10 pages.

Ullmer, et al. mediaBlocks: Physical Containers, Transports, and Controls for Online Media. In: Computer Graphics Proceedings (SIGGRAPH'98), Jul. 19-24, 1998. ACM-0-89791-999-8-8/98/007. http://citeseer.ist.psu.edu/cache/papers/cs/9903/http:zSzzSztangible.media.mit.eduzSzpaperszSzmediaBlocks_SG98zSzmediaBlocks_SG98.pdf/ullmer98mediablocks.pdf. Last accessed Jun. 27, 2008, 8 pages.

Want, et al. Bridging Physical and Virtual Worlds with Electronic Tags. In: Proceedings of CHI'99, ACM Press, Apr. 1999. http://citeseer.ist.psu.edu/cache/papers/cs/13941/http:zSzzSzwww.parc.xerox.comzSzcsIzSzmemberszSzwantzSzpaperszSzetags-chi-may99.pdf/want99bridging.pdf. Last accessed Jun. 27, 2008, 8 pages.

Wilson, et al. BlueTable: connecting wireless mobile devices on interactive surfaces using vision-based handshaking. In: Graphics Interface 2007. http://research.microsoft.com/~awilson/papers/GI%202007.pdf. Last accessed Jun. 27, 2008, 7 pages.

Wilson, et al. PlayAnywhere: A Compact Interactive Tabletop Projection-Vision System. UIST'05, Oct. 23-27, 2005, Seattle, Washington, USA. ACM 1-59593-023-X/05/0010. http://research.microsoft.com/~awilson/papers/wilson%20playanywhere%20uist%202005.pdf. Last accessed Jun. 27, 2008, 10 pages.

Microsoft Surface http://www.microsoft.com/surface/. Last accessed Jun. 30, 2008, 1 page.

Continuous Change is a Way of Living http://www.research.philips.com/password/archive/26/pw26-editorial.html. Last accessed Jul. 1, 2008, 2 pages.

Woolls-King. Making Electronic Games More Sociable http://www.research.philips.com/password/archive/26/downloads/pw26_entertable_24.pdf. Last accessed Jul. 1, 2008, 2 pages.

Krahnstoever, et al. Activity Recognition using Visual Tracking and RFID. In: Proceedings of the Seventh IEEE Workshop on Applications of Computer Vision (WACV/MOTION'05). 0-7695-2271-8/05 IEEE. http://ieeexplore.ieee.org/iel5/4129446/4129447/04129523.pdf?tp=&arnumber=4129523&isnumber=4129447. Last accessed Jul. 2, 2008, 7 pages.

Raskar, et al. Photosensing wireless tags for geometric procedures. Sep. 2005/vol. 48, No. 9 Communications of the ACM, 46-51. http://delivery.acm.org/10.1145/1090000/1082019/p46-raskar.pdf?key1=1082019&key2=4020005121&coll=GUIDE&dl=GUIDE&CFID=35169930&CFTOKEN=62169717. Last accessed Jul. 2, 2008, 6 pages.

Reilly, et al. Marked-up maps: combining paper maps and electronic information resources. In: Personal and Ubiquitous Computing, vol. 10 , Issue 4 (Mar. 2006). pp. 215-226. http://delivery.acm.org/10.1145/1130000/1122742/779_2005_Article_43.pdf?key1=1122742&key2=9750005121&coll=GUIDE&dl=GUIDE&CFID=35169930&CFTOKEN=62169717. Last accessed Jul. 2, 2008, 12 pages.

Wellner. Interacting with paper on the DigitalDesk. In: Communications of the ACM, vol. 36, Issue 7, Jul. 1993. http://delivery.acm.org/10.1145/160000/159630/p87-wellner.pdf?key1=159630&key2=7301005121&coll=GUIDE&dl=GUIDE&CFID=35169930&CFTOKEN=62169717. Last accessed Jul. 2, 2008, 10 pages.

Cerrada, et al. Fusion of 3D Vision Techniques and RFID Technology for Object Recognition in Complex Scenes. 1-4244-0830-X/07 IEEE http://ieeexplore.ieee.org/iel5/4447489/4447490/04447604.pdf?tp=&isnumber=&arnumber=4447604. Last accessed May 14, 2008, 6 pages.

Lee, et al. Object Tracking based on RFID Coverage Visual Compensation in Wireless Sensor Network. 1-4244-0921-7/07 IEEE. http://ieeexplore.ieee.org/iel5/4252534/4252535/04252959.pdf?isnumber=4252535&prod=CNF&arnumber=4252959&arSt=1597&ared=1600&arAuthor=Jinseok+Lee%3B+Kyoung-Su+Park%3B+Sangjin+Hong%3B+We-Duke+Cho. Last accessed May 14, 2008, 4 pages.

Nakagawa, et al. Image Systems Using RFID Tag Positioning Information. In : NTT Technical Review, vol. 1 No. 7 Oct. 2003. http://www.ntt.co.jp/tr/0310/files/ntr200410079.pdf. Last accessed May 14, 2008, 5 pages.

Sugimoto, et al. Supporting Face-to-face Group Activities with a Sensor-Embedded Board. http://www.edgelab.sfu.ca/CSCW/cscw2000/cscw_sugimoto.pdf. Last accessed May 15, 2008, 4 pages.

Avrahami et al., "Guided Gesture Support in the Paper PDA," Submitted to UIST '01. retrieved at <<http://chromaticgray.com/cv/PaperPDA.pdf>> Last accessed Jun. 9, 2008, 2 pages.

Beringer, "Evoking Gestures in SmartKom—Design of the Graphical User Interface," retrieved at <<http://www.techfak.uni-bielefeld.de/ags/wbski/gw2001book/draftpapers/sv-beringer_37.pdf>> Last accessed Jun. 9, 2008, 12 pages.

Buxton, "Lexical and Pragmatic Considerations of Input Structures." In Computer Graphics, 17(1), 31-37, 1983, retrieved at <<http://www.billbuxton.com/lexical.html>> Last accessed Jun. 9, 2008, 11 pages.

Cassell, "A Framework for Gesture Generation and Interpretation," In Computer Vision in Human-Machine Interaction, R. Cipolla and A. Pentland, eds. retrieved at <<http://citeseer.ist.psu.edu/cache/papers/cs/2011/http:zSzzSzgn.www.media.miteduzSzgroupszSzgnzSzpublicationszSzgesture_wkshop.pdf/a-framework-for-gesture.pdf>> Last accessed Jun. 9, 2008, 19 pages.

The Chinese Office Action mailed Aug. 21, 2012 for Chinese patent application No. 200980117593.7, a counterpart foreign application of U.S. Appl. No. 12/118,955, 15 pages.

Dietz et al., "DiamondTouch: A Multi-User Touch Technology," In UIST'01, Orlando, FL retrieved at <<http://delivery.acm.org/10.1145/510000/502389/p219-dietz.pdf?key1=502389&key2=0452892121&coll=GUIDE&dl=GUIDE&CFID=72023659&CFTOKEN=10869625>> Last accessed Jun. 9, 2008, 8 pages.

The European Search Report mailed Mar. 16, 2012 for European patent application No. 09747057.9, 8 pages.

Epps et al., "A Study of Hand Shape Use in Tabletop Gesture Interaction," in CHI 2006, Apr. 22-27, 2006. Montreal, Quebec, Canada. ACM 1-59593-298-4/06/004. retrieved at <<http://delivery.acm.org/10.1145/1130000/1125601/p748-epps.pdf?key1=1125601&key2=4072892121&coll=GUIDE&dl=GUIDE&CFID=72023941&CFTOKEN=75878795>> Last accessed Jun. 9, 2008, 6 pages.

"Eye Toy," Wikipedia, Oct. 25, 2007, Retrieved on Jan. 13, 2012 at <<http://en.wikipedia.org/w/index.php?title=EyeToy&oldid=166687900>> 5 pages.

Forlines et al., "Multi-User, Multi-Display Interaction with a Single-User, Single-Display Geospatial Application," In UIST'06, Oct. 15-18, 2006, Montreux, Switzerland. ACM 1-59593-313-1/06/0010 retrieved at <<http://www.dgp.toronto.edu/~dwigdor/research/forlines_uist_2006.pdf>> Last accessed Jun. 9, 2008, 4 pages.

Furnas et al., "The Vocabulary Problem in Human-System Communication," In Communications of the ACM, Nov. 1987, vol. 30, No. 11. retrieved at <<http://delivery.acm.org/10.1145/40000/32212/p964-furnas.pdf?key1=32212&key2=7992892121&coll=GUIDE&dl=GUIDE&CFID=72024403&CFTOKEN=86325593>> Last accessed Jun. 9, 2008, 8 pages.

Good et al., "Building a User-Derived Interface," Research Contributions, Human Aspects of Computing, Communications of the ACM, vol. 27, No. 10, Oct. 1984. retrieved at <<http://delivery.acm.org/10.1145/360000/358284/p1032-good.pdf?key1=358284&key2=3603892121&coll=GUIDE&dl=GUIDE&CFID=72024489&CFTOKEN=70249236>> Last accessed Jun. 9, 2008, 12 pages.

Harwig, "Continuous Change is a Way of living," Password: Philips Reasearch Technology magazine, issue 26, Feb. 2006, pp. 2-3 (+ cover).

Hutchins et al., "Direct Manipulation Interfaces," In Human-Computer Interaction, 1985, vol. 1, 311-338 retrieved at <<http://hci.ucsd.edu/120/direct-manip.pdf>> Last accessed Jun. 9, 2008, 28 pages.

Liu et al., "TNT: Improved Rotation and Translation on Digital Tables," In: Graphics Interface 2006. retrieved at <<http//delivery.acm.org/10.1145/1150000/1143084/p25-liu.pdf?key1=1143084&key2=9243892121&coll=GUIDE&dl=GUIDE%CFID=31373040&CFTOKEN=93238135>> Last accessed Jun. 9, 2008, 8 pages.

Long et al., "Implications for a Gesture Design Tool," In CHI'99, Pittsburgh, PA, USA retrieved at <<http://delivery.acm.org/10.1145/310000/302985/p40-long.pdf?key1=302985&key2=0153892121&coll=portal&dl=ACM&CFID=72025099&CFTOKEN=39528770>> Last accessed Jun. 9, 2008, 8 pages.

Maaas. Vision Systems, retrieved at <<http://www.vision-systems.com/display_article/285207/19/ARTCL/none/none/3-D-system-profiles-highway-surfaces/>> Last accessed Apr. 30, 2008, 4 pages.

Malik et al., "Interacting with Large Displays from a Distance with Vision-Tracked Multi-Finger Gestural Input," In UIST'05, Oct. 23-27, 2005, Seattle, Washington, USA. ACM 1-59593-023-X/05/0010 retrieved at <<http://delivery.acm.org/10.1145/1100000/1095042/p43-malik.pdf?key1=1095042&key2=0063892121&coll=GUIDE&dl=GUIDE&CFID=72025262&CFTOKEN=45252059>> Last accessed Jun. 9, 2008, 10 pages.

Mignot et al., "An Experimental Study of Future 'Natural' Multimodal Human-Computer Interaction," retrieved at <<http://delivery.acm.org/10.1145/270000/260075/p67-mignot.pdf?key1=260075&key2=1573892121&coll=GUIDE&dl=ACM&CFID=72025485&CFTOKEN=29812262>> Last accessed Jun. 9, 2008, 2 pages.

Morris et al., "Cooperative Gestures: Multi-User Gestural Interactions for Co-located Groupware," CHI 2006, Apr. 22-28, 2006, Montreal, Quebec, Canada. ACM 1-59593-178-3/06/0004 retrieved at <<http://research.microsoft.com/~merrie/papers/coopgestpdf>> Last accessed Jun. 9, 2008, 10 pages.

Morris, "Supporting Effective Interaction with Tabletop Groupware," retrieved at <<http://hci.stanford.edu/publication/2006/ieee_workshop.pdf>> Last accessed Jun. 9, 2008, 2 pages.

Moscovich et al., "Multi-finger Cursor Techniques," retrieved at <<http://www.dgp.toronto.edu/~tomer/store/papers/multifcursors-gi2006.pdf>> Last accessed Jun. 9, 2008, 7 pages.

Nielsen et al., "A procedure for developing intuitive and ergonomic gesture interfaces for HCI," retrieved at <<http://www.vision.auc.dk/~tbm/Publication/gw03.pdf>> Last accessed Jun. 9, 2008, 16 pages.

Office Action for U.S. Appl. No. 12/185,166, mailed on May 5, 2011, Meredith J. Morris, "A User-Defined Gesture Set for Surface Computing," 22 pages.

Office Action for U.S. Appl. No. 12/425,405, mailed on Jan. 23, 2012, Andrew D. Wilson, "Magic Wand," 12 pages.

Office Action for U.S. Appl. No. 12/118,955, mailed on Oct. 25, 2011, Andrew D. Wilson, "Computer vision-based multi-touch sensing using infrared lasers," 14 pages.

Office Action for U.S. Appl. No. 12/185,166, mailed on Oct. 27, 2011, Meredith June Morris, "User-Defined Gesture Set for Surface Computing," 29 pages.

Office Action for U.S. Appl. No. 11/939,739, mailed on Nov. 17, 2011, Andrew D. Wilson, "Magic Wand," 10 pages.

Office Action for U.S. Appl. No. 12/490,335, mailed on Dec. 15, 2011, Meredith June Morris, "User-Defined Gesture Set for Surface Computing," 23 pages.

Office Action for U.S. Appl. No. 12/490,335, mailed on Apr. 12, 2012, Meredith J. Morris, "User-Defined Gesture Set for Surface Computing," 28 pages.

Office Action for U.S. Appl. No. 12/185,166, mailed on Apr. 13, 2012, Meredith J. Morris, "User-Defined Gesture Set for Surface Computing," 34 pages.

Non-Final Office Action for U.S. Appl. No. 11/939,739, mailed on May 31, 2011, Andrew David Wilson, "Magic Wand," 7 pages.

Office action for U.S. Appl. No. 12/118,955, mailed on Jun. 21, 2012, Wilson, "Computer Vision-based Multi-Touch Sensing Using Infrared Lasers," 21 pages.

Office Action for U.S. Appl. No. 12/425,405, mailed on Jul. 20, 2011, Andrew D. Wilson, "Magic Wand," 11 pages.

Office action for U.S. Appl. No. 12/185,166, mailed on Sep. 7, 2012, Morris et al., "User-Defined Gesture Set for Surface Computing," 34 pages.

"Office Assistant", Wikipedia Free Encyclopedia, Nov. 1, 2006, 2 pages.

Pavlovic et al., "Visual Interpretation of Hand Gestures for Human-Computer Interaction: A Review," retrieved at <<http://64.233.183.104/search?q=cache:tzr4JTo4ekwJ:www.ifp.uiuc.edu/~vladimir/papers/uiuc-bi-ai-rcv-95-10.gz+Visual+Intrepretation+of+Hand+Gestures+for&hl=en&ct=cink&cd=2&gl=uk>> Last accessed Jun. 9, 2008, 48 pages.

PCT Search Report for PCT Application No. PCT/US2009/051603, mailed Mar. 2, 2010, 11 pages.

Poggi, "From a Typology of Gestures to a Procedure for Gesture Production," retrieved at <<http://host.uniroma3.it/decenti/poggi/cursitopdf/poggipk2.pdf>> Last accessed Jun. 9, 2008, 12 pages.

Rekimoto, "SmartSkin: An Infrastructure for Freehand Manipulation on Interactive Surfaces," CHI 2002, Apr. 20-25, 2002, Minneapolis, Minnesota, USA. ACM 1-58113-453-3/02/0004. Interactive Surfaces retrieved at <<http://www.sonycsl.co.jp/person/rekimoto/papers/chi02.pdf>> Last accessed Jun. 9, 2008, 8 pages.

Robbe, "An Empirical Study of Speech and Gesture Interaction: Toward the Definition of Ergonomic Design Guidelines," in CHI'98, Apr. 18-23, 1998, retrieved at <<http://delivery.acm.org/10.1145/290000/286815/p349-robbe.pdf?key1=286815&key2=8854892121&coll=GUIDE&dl=ACM&CFID=31374569&CFTOKEN=67468866>> Last accessed Jun. 9, 2008, 2 pages.

Robbe-Reiter, et al., "Expression constraints in multimodal human-computer interaction," In IUI 2000, New Orleans, LA, USA. retrieved at <<http://delivery.acm.org/10.1145/330000/325852/p225-robbe-reiter.pdf?key1=325852&key2=8054892121&coll=GUIDE&dl=GUIDE&CFID=72026670&CFTOKEN=11768299>> Last accessed Jun. 9, 2008, 4 pages.

Rossini, "The Analysis of Gesture: Establishing a Set of Parameters," GW 2003, LNAI 2918, pp. 124-131, 2004, retrieved at <<http://www.springerlink,com/content/pmb8h6r2laf93u2r/fulltext.pdf>> Last accessed Jun. 9, 2008, 8 pages.

Rubine, "Specifying Gestures by Example," ACM, In the Proceedings of the 18th Annual Conference on Computer Graphics and Interactive Techniques, vol. 25, Issue 4, Jul. 1991, pp. 329-337.

Tang, "Findings from observational studies of collaborative work," retrieved at <<http://www.cs.brandeis.edu/~cs215notes/week3/psyc/1.html>> Last accessed Jun. 9, 2008, 6 pages.

Tse et al., "Enabling Interaction with Single User Applications through Speech and Gestures on a Multi-User Tabletop," AVI'06, May 23-26, 2006, Venezia, Italy. ACM 1-59593-353-0/06/0005, retrieved at <<http://delivery.acm.org/10.1145/1140000/1133336/p336-tse.pdf?key1=1133336&key2=9584892121&coll=GUIDE&dl=GUIDE&CFID=31374911&CFTOKEN=67865781>> Last accessed Jun. 9, 2008, 8 pages.

Voida et al., "A Study on a Manipulation of 2D Objects in a Projector/Camera-Based Augmented Reality Environment," CHI 2005, Apr. 2-7, Portland, Oregon, USA. ACM 1-58113-998-5/05/0004, retrieved at <<http://delivery.acm.org/10.1145/1060000/1055056/p611-voida.pdf?key1=1055056&key2=5294892121&coll=GUIDE&dl=GUIDE&CFID=31374997&CFTOKEN=45346320>> Last accessed Jun. 9, 2008, 10 pages.

Wigdor et al., "Under the Table Interaction," UIST'06, Oct. 15-18, 2006, Montreux, Switzerland. ACM 1-59593-313-1/06/0010, retrieved at <<http://delivery.acm.org/10.1145/1170000/1166294/p259-wigdor.pdf?key1=1166294&key2=7505892121&coll=GUIDE&dl=GUIDE&CFID=72027547&CTOKEN=50609154>> Last accessed Jun. 9, 2008, 10 pages.

Willson, "Computer vision-Based Multi-Touch Sensing Using Infrared Lasers," U.S. Appl. No. 12/185,166, filed May 12, 2008, 22 pages.

Wilson, "Determining Orientation in an External Reference Frame," filed on Oct. 23, 2008, U.S. Appl. No. 12/256,747, 26 pages.

Wobbrock et al., "Maximizing the Guessability of Symbolic Input," CHI 2005, Apr. 2-7, 2005, Portland, Oregon, USA. ACM 1-59593-002-7/05/0004, retrieved at <<http://delivery.acm.org/10.1145/1060000/1057043/p1869-wobbrock.pdf?key1=1057043&key2=5715892121&coll=GUIDE&dl=GUIDE&CFID=31375304&CFTOKEN=90405114> Last accessed Jun. 9, 2008, 4 pages.

Wu et al., "Gesture Registration, Relaxation, and Reuse for Multi-Point Direct-Touch Surfaces," Proceedings of the First IEEE International Workshop on Horizontal Interactive Human-Computer Systems (TABLETOP '06) retrieved at <<http://ieeexplore.ieee.org/ie15/10546/33359/01579211.pdf?isnumber=33359&prod=CNF&amumber=1579211&arSt=+8+pp.&ared=&arAuthor=Wu%2C+M.%3B+Chia+Shen%3B+Ryall%2C+K.%B+ForlinesBalakrishnan%2C+C+3B+Ba;alrosjmam%2C+R>> Last accessed Jun. 9, 2008, 8 pages.

Wu et al., "Multi-Finger and Whole Hand Gestural Interaction Techniques for Multi-User Tabletop Displays," UIST'03, Vancouver, BC Canada. ACM 1-58113-636-6/03/0010. retrieved at <<http://delivery.acm.org/10.1145/970000/964718/p193-wu.pdf?key1=964718&key2=5525892121&coll=GUIDE&dl=GUIDE&CFID=31375440&CFTOKEN=50814190>> Last accessed Jun. 9, 2008, 10 pages.

The Chinese Office Action mailed Nov. 2, 2012 for Chinese patent application No. 200980130773.9, a countperpart foreign application of U.S. Appl. No. 12/185,166, 16 pages.

The Chinese Office Action mailed Mar. 12, 2013 for Chinese patent application No. 200980117593.7, a counterpart foreign application of U.S. Appl. No. 12/118,955, 12 pages.

Office action for U.S. Appl. No. 12/490,335, mailed on Feb. 1, 2013, Morris et al., "User-Defined Gesture Set for Surface Computing," 30 pages.

Office action for U.S. Appl. No. 12/118,955, mailed on Jan. 23, 2013, Wilson et al, "Computer Vision-based Multi-Touch Sensing Using Infrared Lasers," 21 pages.

Olwal, "LightSense: Enabling Spatially Aware Handheld Interaction Devices," In Proceedings of ISMAR 2006 (IEEE and ACM International Symposium on Mixed and Augmented Reality), Santa Barbara, CA, Oct. 22-25, 2006, pp. 119-112, 4 pages.

Wikipedia, "The Wisdom of Crowds," retrieved on Nov. 17, 2012, 2007 at <<http://web.archive.org/web/20071228204455/http://en.wikipedia.org/wiki/>>, 8 pages.

The Chinese Office Action mailed Jan. 8, 2014 for Chinese patent application No. 200980130773.9, a counterpart foreign application of U.S. Appl. No. 12/185,166, 13 pages.

Office action for U.S. Appl. No. 12/490,335, mailed on May 10, 2013, Morris et al., "User-Defined Gesture Set for Surface Computing," 34 pages.

Office action for U.S. Appl. No. 12/118,955, mailed on Jun. 6, 2013, Wilson, "Computer Vision-based Multi-Touch Sensing Using Infrared Lasers," 13 pages.

Office action for U.S. Appl. No. 11/939,739, mailed on Apr. 25, 2013, Wilson et al., "Magic Wand," 10 pages.

The Chinese Office Action mailed Jul. 11, 2013 for Chinese patent application No. 200980117593.7, a counterpart foreign application of U.S. Appl. No. 12/118,955, 12 pages.

The Chinese Office Action mailed Jul. 4, 2013 for Chinese patent application No. 200980130773.9, a counterpart foreign application of U.S. Appl. No. 12/185,166, 6 pages.

Translated the Japanese Office Action mailed May 28, 2013 for Japanese patent application No. 2011-509511, a counterpart foreign application of U.S. Appl. No. 12/118,955, 6 pages.

Office action for U.S. Appl. No. 12/185,166, mailed on Jun. 25, 2013, Morris et al., "User-Defined Gesture Set for Surface Computing," 37 pages.

Translated the Japanese Office Action mailed Sep. 24, 2013 for Japanese patent application No. 2011-522105, a counterpart foreign application of U.S. Appl. No. 12/185,166, 4 pages.

Office action for U.S. Appl. No. 12/490,335, mailed on Oct. 31, 2013, Morris et al., "User-Defined Gesture Set for Surface Computing," 35 pages.

Office action for U.S. Appl. No. 12/185,166, mailed on Nov. 13, 2013, Morris et al., "User-Defined Gesture Set for Surface Computing," 40 pages.

Voida et al., "A Study on the Manipulation of 2D Objects in a Projector/Camera-Based Augmented Reality Environment," retrieved on Aug. 28, 2013 at <<http://dl.acm.org/citation.cfm?id=1055056>>, CHI, 2005, 10 pages.

Wu et al., "Multi-Finger and Whole Hand Gestural Interaction Techniques for Multi-User Tabletop Displays," retrieved on Aug. 29, 2013 at <<http://dl.acm.org/citation.cfm?id=964718>>, ACM Digital Library, 2003, 12 pages.

Kjeldsen, "Polar Touch Detection," retrieved on Apr. 21, 2014 at <<htp://ool-45795253.dyn.optonline.net/FantomHD/Manual%20backups/IBM%20Laptop/12-5-2012/Rick%20Second%Try/Gesture/PAPERS/UIST%20'06/Polar%20Touch%Buttons%20Submit%20Spelling.pdf>>, 2007, 10 pages.

Office action for U.S. Appl. No. 12/425,405, mailed on Mar. 11, 2014, Wilson et al., "Magic Wand," 20 pages.

Final Office Action for U.S. Appl. No. 12/490,335, mailed on May 7, 2014, Meredith J. Morris, "User-Defined Gesture Set for Surface Computing," 57 pages.

The Japanese Office Action mailed Jun. 3, 2014 for Japanese patent application No. 2011-522105, a counterpart foreign application of U.S. Appl. No. 12/185,166, 15 pages.

* cited by examiner

Primary Examiner — Jennifer Mehmood
Assistant Examiner — Mirza Alam
(74) Attorney, Agent, or Firm — Dan Choi; Judy Yee; Micky Minhas

(57) ABSTRACT

The claimed subject matter provides a system and/or a method that facilitates detecting and identifying objects within surface computing. An interface component can receive at least one surface input, the surface input relates to at least one of an object, a gesture, or a user. A surface detection component can detect a location of the surface input utilizing a computer vision-based sensing technique. A Radio Frequency Identification (RFID) tag can transmit a portion of RFID data, wherein the RFID tag is associated with the surface input. A Radio Frequency Identification (RFID) fusion component can utilize the portion of RFID data to identify at least one of a source of the surface input or a portion of data to associate to the surface input.

17 Claims, 10 Drawing Sheets

FUSING RFID AND VISION FOR SURFACE OBJECT TRACKING

CROSS REFERENCE TO RELATED APPLICATION(S)

This application relates to U.S. patent application Ser. No. 12/118,955 filed on May 12, 2008, entitled "COMPUTER VISION-BASED MULTI-TOUCH SENSING USING INFRARED LASERS."

BACKGROUND

Computing devices are increasing in technological ability wherein such devices can provide a plurality of functionality within a limited device-space. Computing devices can be, but not limited to, mobile communication devices, desktop computers, laptops, cell phones, PDA, pagers, tablets, messenger devices, hand-helds, pocket translators, bar code scanners, smart phones, scanners, portable handheld scanners, and any other computing device that allows data interaction. Although each device employs a specific function for a user, devices have been developing to allow overlapping functionality in order to appeal to consumer needs. In other words, computing devices have incorporated a plurality of features and/or applications such that the devices have invaded one another's functionality. For example, cell phones can provide cellular service, phonebooks, calendars, games, voicemail, paging, web browsing, video capture, image capture, voice memos, voice recognition, high-end mobile phones (e.g., smart-phones becoming increasingly similar to portable computers/laptops in features and functionality), etc.

As a result, personal computing devices have incorporated a variety of techniques and/or methods for inputting information. Personal computing devices facilitate entering information employing devices such as, but not limited to, keyboards, keypads, touch pads, touch-screens, speakers, stylus' (e.g., wands), writing pads, etc. However, input devices such as keypads, speakers and writing pads bring forth user personalization deficiencies in which each user can not utilize the data entry technique (e.g., voice, and/or writing) similarly. For example, consumers employing writing recognition in the United States can write in English, yet have distinct and/or different letter variations.

Furthermore, computing devices can be utilized for data communications or data interactions via such above-described techniques. A particular technique growing within computing devices is interactive surfaces or related tangible user interfaces, often referred to as surface computing. Surface computing enables a user to physically interact with displayed data as well as physical objects detected in order to provide a more intuitive data interaction. For example, a photograph can be detected and annotated with digital data, wherein a user can manipulate or interact with such real photograph and/or the annotation data. Thus, such input techniques allow for objects to be identified, tracked, and augmented with digital information. However, typical approaches for recognizing objects or data associated with surface computing rely on complex pattern recognition techniques or the addition of active electronics that alter the visual qualities of such objects. Such techniques for pattern or object recognition are costly and inefficient.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate leveraging Radio Frequency Identification (RFID) technology in order to enhance object detection associated with interactive surfaces, surface computing, and/or interactive displays. A surface detection component can utilize vision-based techniques in order to sense a location and/or a shape for a surface input. The surface input can be a gesture, a portion of a user (e.g., a hand, a finger, a palm, etc.), or a corporeal object. A Radio Frequency Identification (RFID) fusion component can receive a portion of RFID data from an RFID tag coupled to an object, in which the RFID fusion component can provide object identification (e.g., identify a source of a surface input, etc.) or data association. In particular, the RFID fusion component can leverage the RFID data to ascertain the object or a portion of data to associate with such object. In general, the subject innovation can enable computer vision-based activity detection and/or a non-RFID localization technique to be utilized in combination with RFID techniques.

Moreover, the subject innovation can provide optimal image processing techniques in connection with the fusion or combination of vision-based activity sensing and RFID techniques. The surface detection component can employ a Frame Difference Algebra in order to detect a scene change (e.g., from a first frame to a second frame, etc.) such as an addition of an object/surface input, a removal of an object/surface input, or a movement of an object/surface input. In other aspects of the claimed subject matter, methods are provided that facilitates utilizing Radio Frequency Identification (RFID) tags for identification of objects in connection with vision-based activity sensing.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
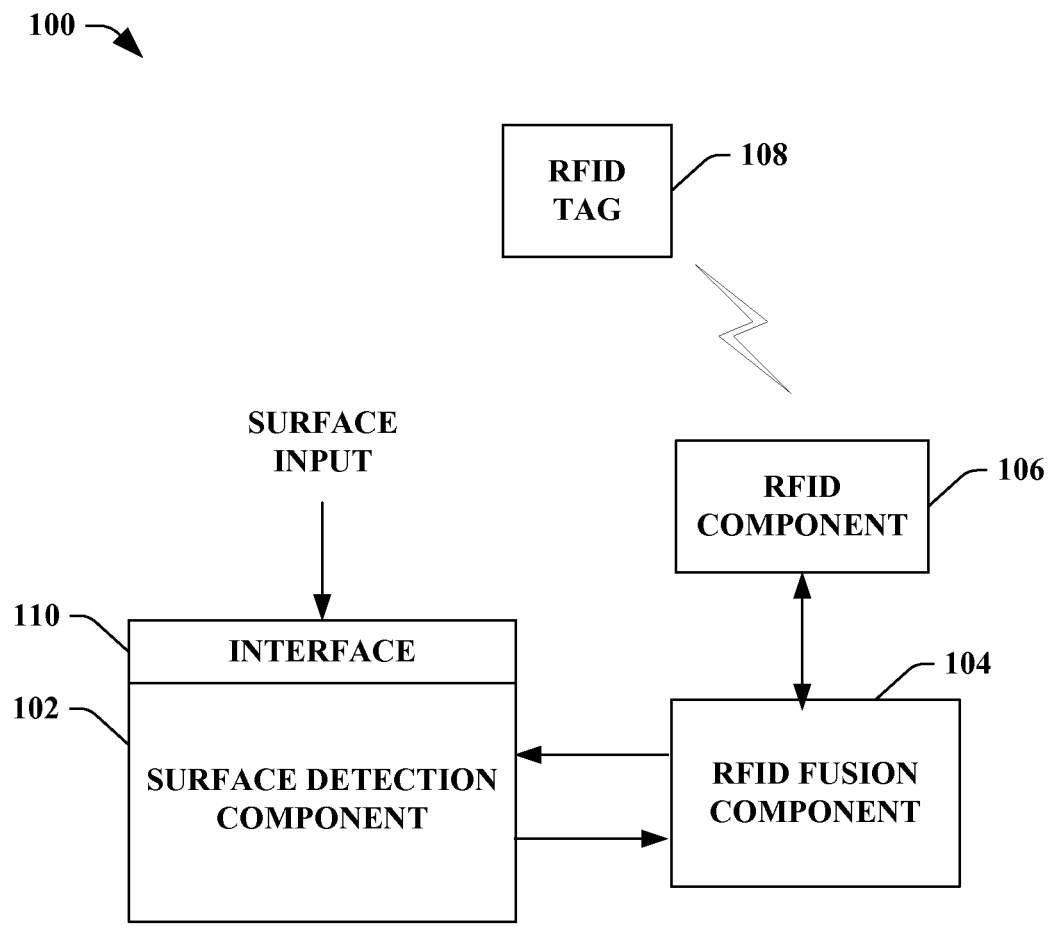
FIG. 1 illustrates a block diagram of an exemplary system that facilitates leveraging Radio Frequency Identification (RFID) technology in order to enhance object detection associated with interactive surfaces, surface computing, and/or interactive displays.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "server," "reader," "client," "sensing," "computer vision," "motion detection," "shape tracking," "interaction," "event detection," "fusion," "rendering," "GDI+," "Direct3D," "application," "module," "network," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD). . . ), smart cards, and flash memory devices (e.g., card, stick, key drive. . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates leveraging Radio Frequency Identification (RFID) technology in order to enhance object detection associated with interactive surfaces, surface computing, and/or interactive displays. The system 100 can include a surface detection component 102 that can detect a surface input from at least one of a user, a corporeal object, or any suitable combination thereof. Upon detection of such surface input, the surface detection component 102 can ascertain a position or location for such surface input. The system 100 can further include a Radio Frequency Identification (RFID) fusion component 104 that can leverage a portion of data transmitted by a Radio Frequency Identification (RFID) tag 108 in order to identify at least one of a source of the surface input or a portion of data to associate to the surface input. In general, the system 100 can incorporate RFID technology with vision-based detection systems (e.g., surface detection systems, tangible user interfaces, surface computing, tabletop interfaces, a tabletop, an interactive graphical user interface that enables physical manipulation of data, etc.).

In particular, the RFID tag 108 can transmit a portion of data to, for instance, a Radio Frequency Identification (RFID) component 106. The RFID component 106 can collect, translate, communicate, format, etc. the portion of transmitted data. Such data can be utilized by the RFID fusion component 104 in surface input identification. For example, an object can be associated with an RFID tag, wherein such data can include object identification, definitions, and/or any other suitable data related to such object. Thus, upon detection of a surface input related to the object, the position can be calculated utilizing the surface detection component 102 and the object can be identified or data can be associated to the object utilizing the portion of transmitted RFID data.

The surface detection component 102 can be utilized to capture touch events, surface inputs, and/or surface contacts. It is to be appreciated that such captured or detected events, inputs, or contacts can be gestures, hand-motions, hand interactions, object interactions, and/or any other suitable interaction with a portion of data representative of a corporeal object. For example, a hand interaction can be translated into corresponding data interactions on a display. In another example, a user can physically interact with a cube physically present and detected, wherein such interaction can allow manipulation of such cube in the real world as well as data displayed or associated with such detected cube. Moreover, a non-RFID localization technique can be employed by the surface detection component 102.

The subject innovation generally relates to interactive surfaces and related tangible user interfaces that can involve objects that are identified, tracked, and augmented with digital information. By leveraging RFID technology, the claimed subject matter can provide an unobtrusive technique of sensing the presence of and identifying tagged objects. In other words, the claimed subject matter can combine computer vision (e.g., an established approach to track objects with a camera, etc.) with RFID technology in order to identify an object as well as a respective location. The system 100 can employ a set of techniques in which movement and shape information from the computer vision system (e.g., the surface detection component 102) can be fused with an RFID event (discussed in more detail below) that identifies objects. By synchronizing these two complementary sensing modalities, the subject innovation can recover position, shape and identification of the objects on the surface, while avoiding complex computer vision processes and exotic RFID solutions.

It is to be appreciated that the RFID fusion component 104 can receive a signal from, for instance, at least one RFID tag 108 and/or a plurality of tags. In one example, the RFID tag 108 can contain an antenna that provides reception and/or transmission to radio frequency queries from the RFID component 106. Furthermore, it is to be appreciated that the RFID component 106 can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. Additionally, although a single RFID component 106 and RFID tag 108 are depicted, it is to be appreciated that a plurality of RFID components 106 and RFID tags 108 can be utilized with the system 100, wherein each RFID component 106 and RFID tag 108 can be of various makers, models, types, brands, etc.

In addition, the system 100 can include any suitable and/or necessary interface component 110 (herein referred to as "interface 110"), which provides various adapters, connectors, channels, communication paths, etc. to integrate the surface detection component 102 and/or the RFID fusion component 104 into virtually any operating and/or database system(s) and/or with one another. In addition, the interface 110 can provide various adapters, connectors, channels, communication paths, etc., that provide for interaction with the surface detection component 102, the RFID fusion component 104, the RFID component 106, the RFID tag 108, and any other device and/or component associated with the system 100.

Figure 2:
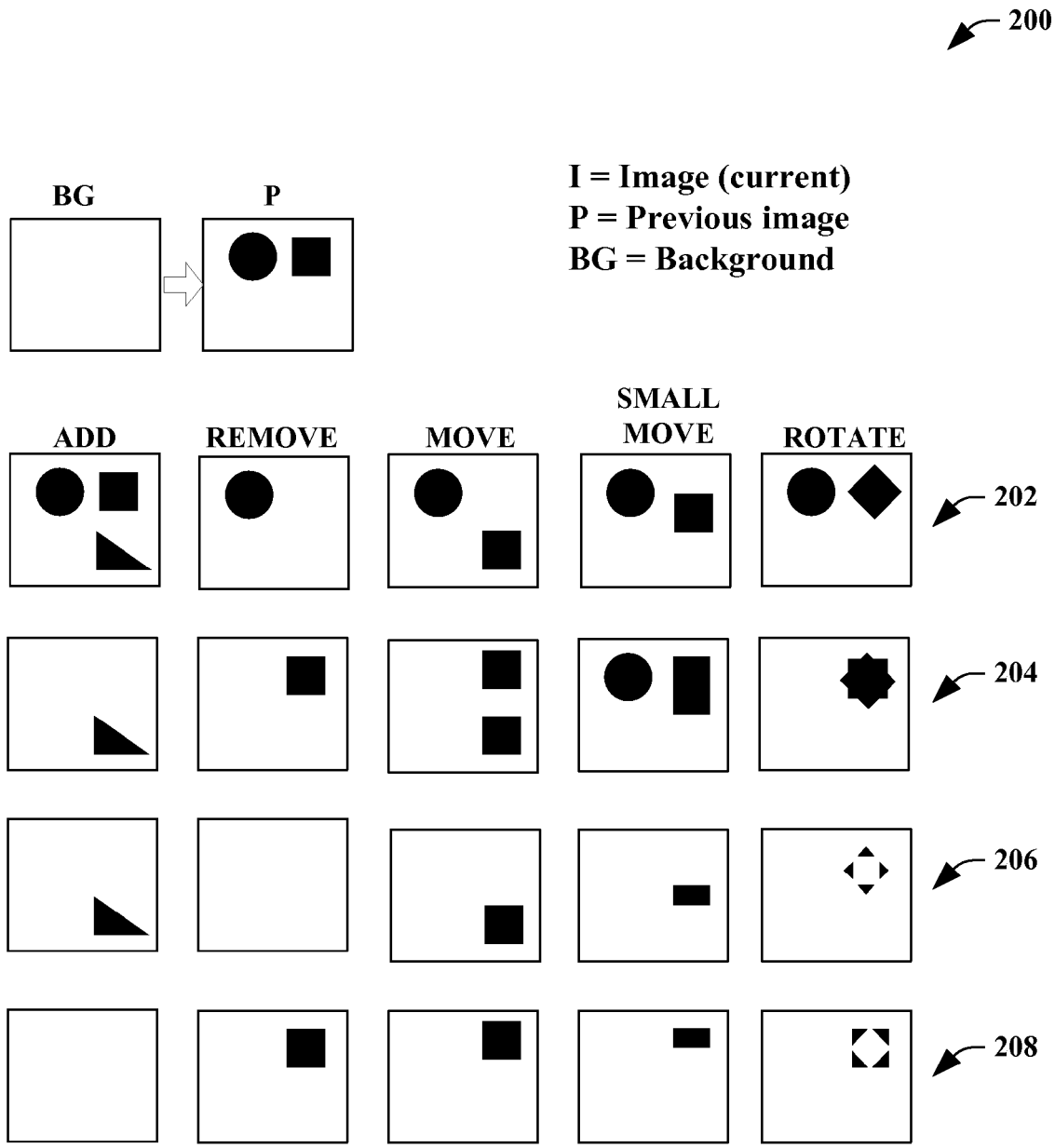
FIG. 2 illustrates a block diagram of an exemplary technique related to frames that facilitate detecting scene changes by employing Frame Difference Algebra (FDA) in accordance with the subject innovation.

FIG. 2 illustrates a technique 200 related to frames that facilitates detecting scene changes by employing Frame Difference Algebra (FDA) in accordance with the subject innovation. The subject innovation can provide a framework that enables detection and tracking of corporeal objects without altering appearance or employing exhaustive and complex learning processes. RFID and computer vision can be fused together in order to enhance surface input detection, tracking, and/or manipulation. In other words, the subject innovation can leverage and combine the respective strengths of RFID (e.g., identification) and computer vision (e.g., location) in order to sense or identify unobtrusively tagged objects.

A general goal of the tracking and detection components in a tabletop system is to recognize objects and track them on the surface. The appearance and interactive behavior of such objects can be augmented by co-located projection and gesture sensing. The framework related to the subject innovation can employ synchronized activity sensing and includes at least one of the following: 1) Detection of activity in the camera image; 2) Detection of RFID tags; 3) Temporal synchronization of vision and RFID activities; and 4) Frame-to-frame correspondence tracking for interactivity.

For activity sensing, computer vision can be utilized to detect changes in the scene, such as the addition, removal and movement of objects on a surface (e.g., any suitable substantially flat surface, etc.). The vision system can find image capture frames that are representative of a change of state on the surface. Each such still frame can summarize the complete, stable state of the objects on the surface. By comparing a still with the previous still, it is possible to deduce whether an object has been added, removed or moved. In the following, image processing operations available to detect such change are described.

It is to be appreciated that a single activity for one object at a time can be detected. Yet, by combining RFID techniques with frame-to-frame correspondence tracking of the shapes (discussed in more detail below), a fluid interaction and simultaneous manipulation of multiple objects can be implemented. It is to be further appreciated that a possibility of ambiguity can exist upon two objects being manipulated at the exact same time.

Given an image related to a surface detection component (not shown) (e.g., a tabletop surface, user interface, interactive user interface, etc.), a set of objects on the surface can be determined through image segmentation techniques (e.g., binarization, connected components analysis, etc.). Once the set of objects is determined, it is relatively straightforward to detect object activity, particularly when the number of objects undergoing change is small.

A background image can be stored when the scene is empty and absolute difference images can be calculated from the background image and subsequent images. Candidate objects can be detected through, for instance, connected component analysis: groups of connected pixels can be classified as distinct, independent objects.

Add, remove and move events or surface inputs can be determined by comparing the list of connected components found in a current frame to that of a previous frame, using set difference operations. An increase in the number of objects (e.g., by one) indicates the addition of an object to the surface, while a decrease of one corresponds to object removal. Without resorting to object feature matching and recognition techniques, movement can be detected as an object being removed and another object (e.g., the same) being added (e.g., the number of objects is unchanged). A related approach can determine that a connected component from a previous frame and another from a current frame correspond to the same physical object if they appear at the same location in the image.

In particular, the technique 200 can relate to Frame Difference Algebra (FDA), wherein FDA can be a set of minimal image processing operations for vision-based detection of scene changes. The technique 200 can avoid complex computer vision-based recognition techniques. The technique 200 can analyze the temporal correlation of RFID tags and corresponding objects detected (e.g., a camera, the surface detection component, etc.) to establish the identity of shapes in a scene or frame. In one example, the combined use of vision and RFID enables the creation of a set of techniques to integrate with existing rear-projected tabletop systems.

The Frame Difference Algebra (FDA) can use absolute difference images and binary image operations for robust and fast detection of scene changes under a constraint such as one object being manipulated at one time. The background image (BG), current frame (J) and previous frame (P) are used in the calculations as illustrated in technique 200. By comparing the number of shapes in the resulting images with shapes that appeared (A) and disappeared (D), the technique 200 can infer whether an object was added, moved or removed.

Changes in the image can be mapped to surface activity by a Frame Difference Algebra (FDA) that detects scene changes such as the addition, removal, or movement of an object, with minimal image processing operations. The FDA can detect scene changes that take place between two still frames.

Three images are used for the FDA calculations as illustrated in technique 200, a background image (BG), a previous frame (P), and a current frame (I). The current image (I) can be illustrated at reference numeral 202. Denoting the pixel-wise absolute differencing operator $\Delta$, $\Delta(I, P)$ can leave areas of the image which just changed (e.g., see reference numeral 204). Furthermore, $\Delta(I, BG)$ and $\Delta(P, BG)$ can be computed, which can include the objects that exist in the current and previous frame, respectively. This can be masked with $\Delta(I, P)$, in order to obtain images $A=\Delta(I, P)$ AND $\Delta(I, BG)$ (see reference numeral 206), and $D=\Delta(I, P)$ AND $\Delta(P, BG)$ (see reference numeral 208). Image A can include objects not present in the previous frame, but present in the current frame, which can indicate objects that have appeared. D can include objects present in the previous frame, but not in the current frame, which can indicate objects that have disappeared.

The sum of pixels in the difference image can indicate if there is a change (e.g., comparing to a defined threshold, etc.) for an event to have occurred. The following cases can be implemented: 1) If sum(A)>>sum(D), then an object has been added; 2) If sum(D)>>sum(A), then an object has been removed; and 3) If sum(A)≈sum(D), then an object has been moved.

The subject innovation can store an image mask for each new added object (A) and an associated RFID. It is to be appreciated that the mask may contain pixels corresponding to the object even if many objects are already on the surface. In one example, the masks can be computed by binarizing a difference image. In such an example, thresholding can be implemented, yet the difference image may contain one object (independent of the number of objects on the surface). It is to be appreciated that the threshold can be set generously. The moved object can be determined by finding which of the stored masks representing the current objects on the surface is most similar to the new mask D. It is to be appreciated that any suitable image comparison operation can be employed for such determination. The sum of the absolute differences between two binary masks can be utilized, wherein a small difference can indicate a match. The mask stored for the object can be updated with mask A.

It is to be appreciated that the technique 200 can handle two objects right next to each other before one of them is moved, or when one object is moved right next to another. Moreover, the FDA can store a timestamp and a location for an object that has been added, removed or moved. Because the FDA involves simple, robust operations on the image, a fast detection mechanism that is straightforward to implement can be utilized to avoid assumptions related to object shape, appearance, position and/or orientation.

The FDA can be extended for more complex scenarios depending on the requirements of the application. For example, FDA can be used to combine with continuous tracking of objects, in order to allow fluid interaction and the manipulation of multiple objects (discussed in more detail below).

Figure 3:
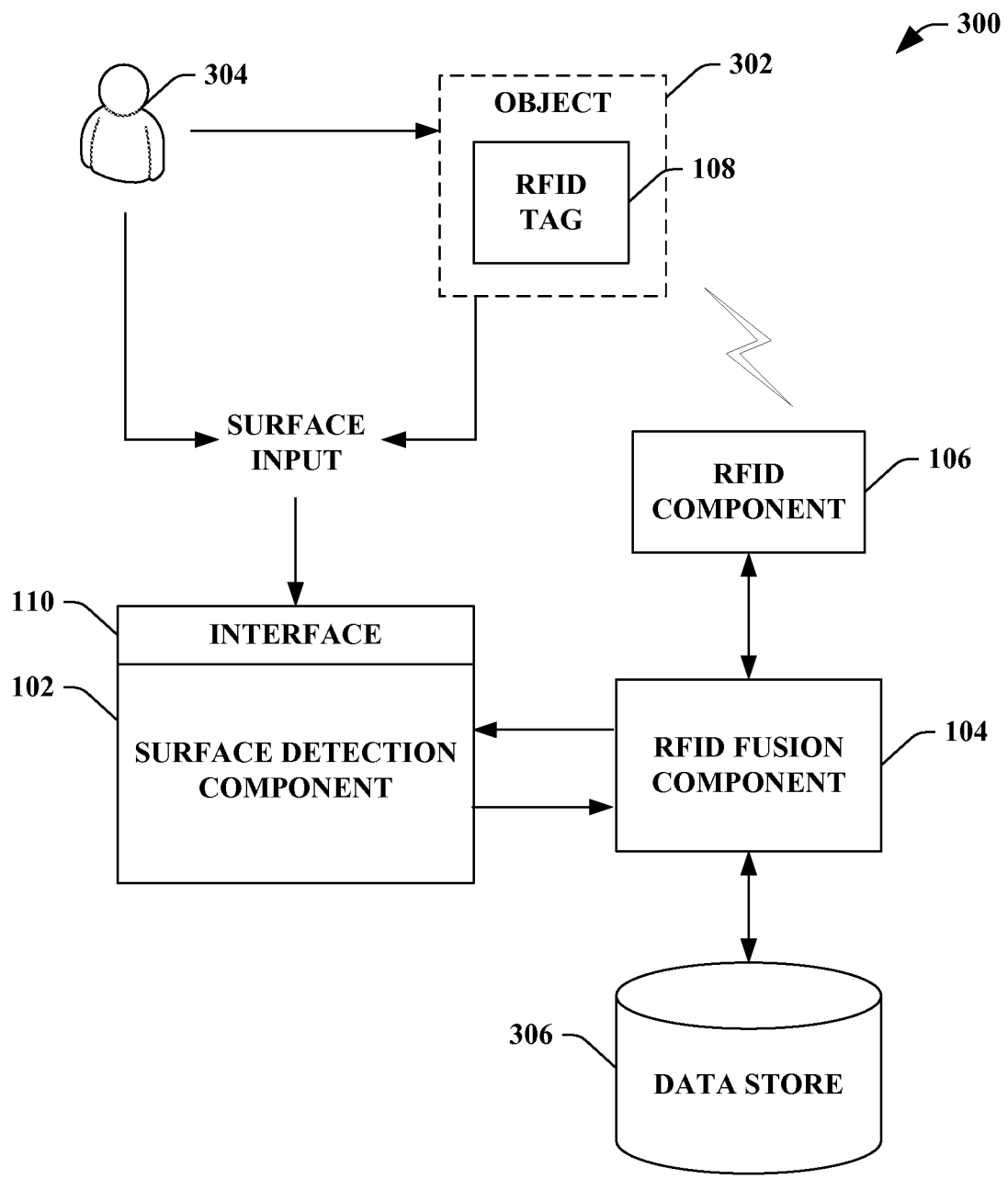
FIG. 3 illustrates a block diagram of an exemplary system that facilitates utilizing Radio Frequency Identification (RFID) tags for identification of objects in connection with vision-based activity sensing.

FIG. 3 illustrates a system 300 that facilitates utilizing Radio Frequency Identification (RFID) tags for identification of objects in connection with vision-based activity sensing. The system 300 can include the surface detection component 102 that can detect a surface input associated with at least one of a user 304, an object 302, and/or any suitable combination thereof The system 300 can enhance vision-based detection by utilizing RFID technology for identification of objects. Specifically, the RFID tag 108 can be coupled (e.g., incorporated, affixed, integrated, etc.) to the object 302 which the RFID tag 108 can communicate a portion of data (e.g., RFID data wirelessly communicated to the RFID component 106), wherein the RFID fusion component 104 can utilize such data to identify the object 302 and/or provide information related to such object 302. The surface detection component 102 (e.g., computer vision-based activity sensing, surface computing, etc.) can provide a position and/or a shape of the object 302. By leveraging the data transmitted by the RFID tag 108, the object 302 can be identified. For example, the RFID tag 108 can be embedded into the object 302.

The system 300 can further include a data store 306 that can store various data related to the system 300. For instance, the data store 306 can include any suitable data related to the surface detection component 102, the RFID fusion component 104, the RFID component 106, the RFID tag 106, the object 302, the user 304, etc. For example, the data store 306 can store data such as, but not limited to, RFID data, RFID data related to a particular object, identification data for an object, RFID tag collections, vision-based techniques, FDA technique data, surface detection techniques, object identification information, tracking data for objects, user preferences, user data, RFID tag data (e.g., tag type, range, frequency, etc.), RFID component data (e.g., settings, configurations, etc.), RFID firmware, etc.

The data store 306 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 306 of the subject systems and methods is intended to comprise, without being limited to, these and any other suitable types of memory and/or storage. In addition, it is to be appreciated that the data store 306 can be a server, a database, a relational database, a hard drive, a pen drive, and the like.

Whereas RFID tags can be detected reliably in the range of antennas, the system 300 can enable such RFID tag 108 to be detected when within range on a surface related to the surface detection component 102 (e.g., tabletop, surface computing, visible in a camera image, etc.). Such a technique can ensure that activity detected by the surface detection component 102 (e.g., a vision system, etc.) and the RFID component 106 (e.g., RFID reader, etc.) can be synchronized.

The antenna type can be chosen to support, for instance, a tabletop application. It is to be appreciated that the antennas can be placed unobtrusively. In one example, the antennas can be integrated with the surface associated with the vision-based activity sensing (e.g., the surface detection component 102). In another example, RFID reading can be limited to the surface by implementing a design in which two custom elongated transmitting and receiving wire loops are placed directly on the surface, on opposite sides of the area to be monitored. For instance, a wire loop antenna can effectively restrict RFID sensing to the surface. In still another example, an area antenna can be employed. A transmitting and receiving area antenna can be placed opposite one another, under the surface and angled towards the center in order to monitor a display. Moreover, such area antennas can be placed at a sufficiently steep angle in order to reduce a premature detection of an object.

Figure 4:
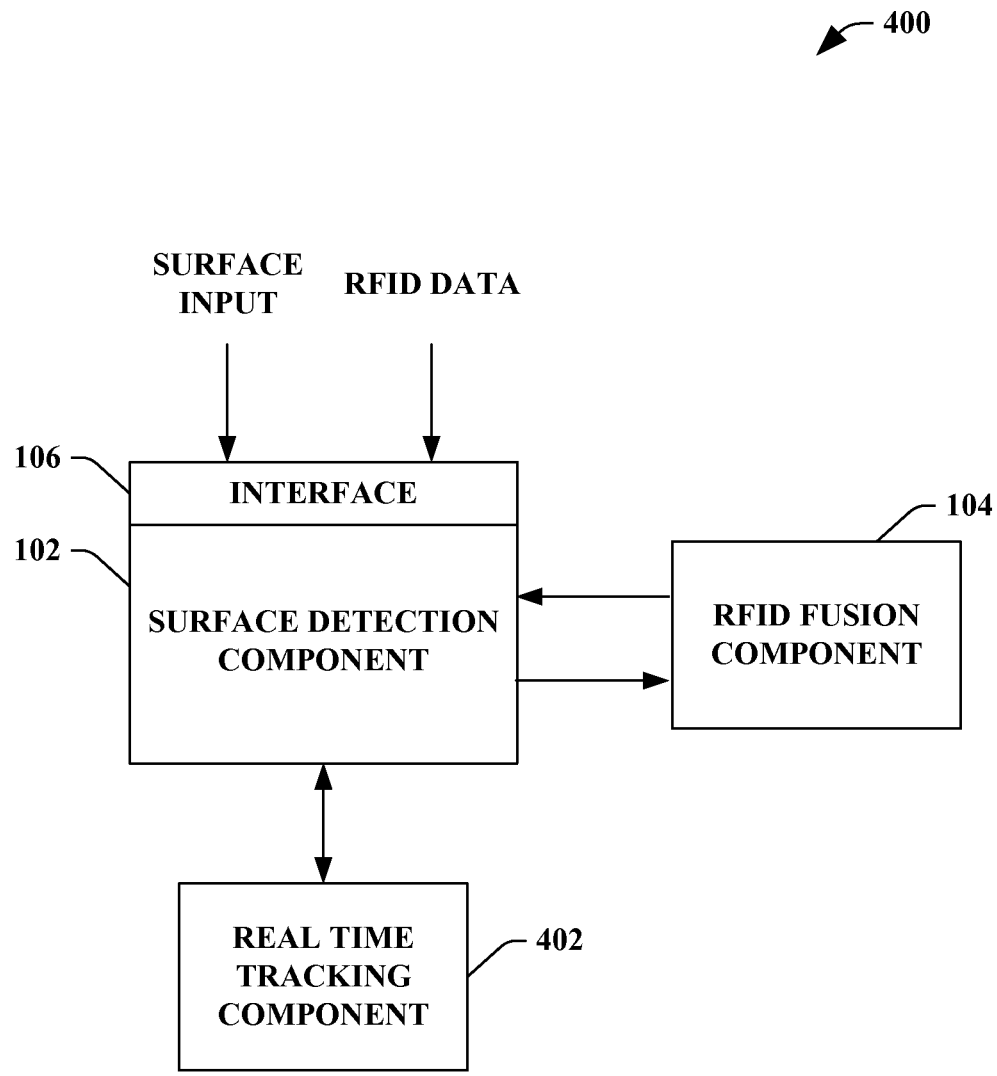
FIG. 4 illustrates a block diagram of an exemplary system that facilitates implementing frame-by-frame tracking for sensing frameworks that incorporate Radio Frequency Identification (RFID) technology.

FIG. 4 illustrates a system 400 that facilitates implementing frame-by-frame tracking for sensing frameworks that incorporate Radio Frequency Identification (RFID) technology. The system 400 can include the RFID fusion component 104 that can optimize object identification in connection with vision-based surface detection such as the surface detection component 102. A location and/or shape for a surface input or object can be ascertained by the surface detection component 102 and an identification of such surface input can be provided by evaluating received RFID data. For example, an object can include an RFID tag, wherein the RFID fusion component 104 can evaluate the RFID data in order to provide an identification of the object or additional data associated with such object (e.g., displayable information, graphics, text, audio, video, etc.).

The vision-based event detection provided by the surface detection component 102 can yield accurate shape and position information for objects in the scene. Moreover, RFID sensing provided by the RFID data and the RFID fusion component 104 can accurately identify objects. A fusion framework utilized by the system 400 can provide a mechanism to synchronize the information from these two modalities such that each object can be identified. A data store (e.g., see data store 306 in FIG. 3) can include or store events, wherein the data store can continuously store detected vision events and/or RFID events. For example, when a new object appears, disappears, or is moved, as detected by our image processing techniques (e.g., the surface detection component 102), a time-stamped entry can be added as well as a reference to the corresponding still image in the FDA. Furthermore, a time-stamped event can be added when an RFID tag appears or disappears. Thus, the data store (not shown) can include state changes that have occurred, such that the state of objects on the surface may be retrieved at any time.

For example, a matching process can be employed to identify a corresponding and unmatched event in a modality when a new event is detected in either modality (e.g., RFID sensing, motion, vision-based detection, etc.). For example, when an event is detected in the RFID modality the system 400 can match a corresponding event in vision-based modality (and vice versa). If found, the two events can be marked as matched and the still image from the FDA can be associated with the RFID data. Upon identification a lookup in an object data store can be performed, wherein the RFID can be associated with additional metadata, such as the name of the object. That information can be displayed at the location of the shape, as indicated by the FDA.

The system 400 can further include a real time tracking component 402. While the system 400 provides a mechanism to identify and track objects in the scene, such tracking relates to the activity to one object at a time and in-between still frames. This can enable the system 400 to perform with front-projection systems (e.g., the surface detection component 102). Moreover, the system 400 can be employed with a rear-projected system which allows fluid tracking of objects while such objects are in motion (e.g., since a hand may not occlude objects it interacts with from the camera's point of view, shapes touching the surface can be robustly and reliably detected, etc.).

The real time tracking component 402 can employ a frame-to-frame correspondence tracking to associate moving objects with the same ID in which such object(s) had in the previous frame. The real time tracking component 402 can determine such correspondence by computing the distance of a given object to every other object on the surface, such that a shape in the new frame inherits the ID of the closest shape in the previous frame, given that such shape is not a newly introduced object. It is to be appreciated that the correspondence can be extended with more sophisticated methods, such as common pattern and template based tracking techniques. The real time tracking component 402 can provide continuous tracking that effectively addresses the FDA, such that multiple objects can be simultaneously manipulated on the surface in order to enable responsive and fluid interaction.

Figure 5:
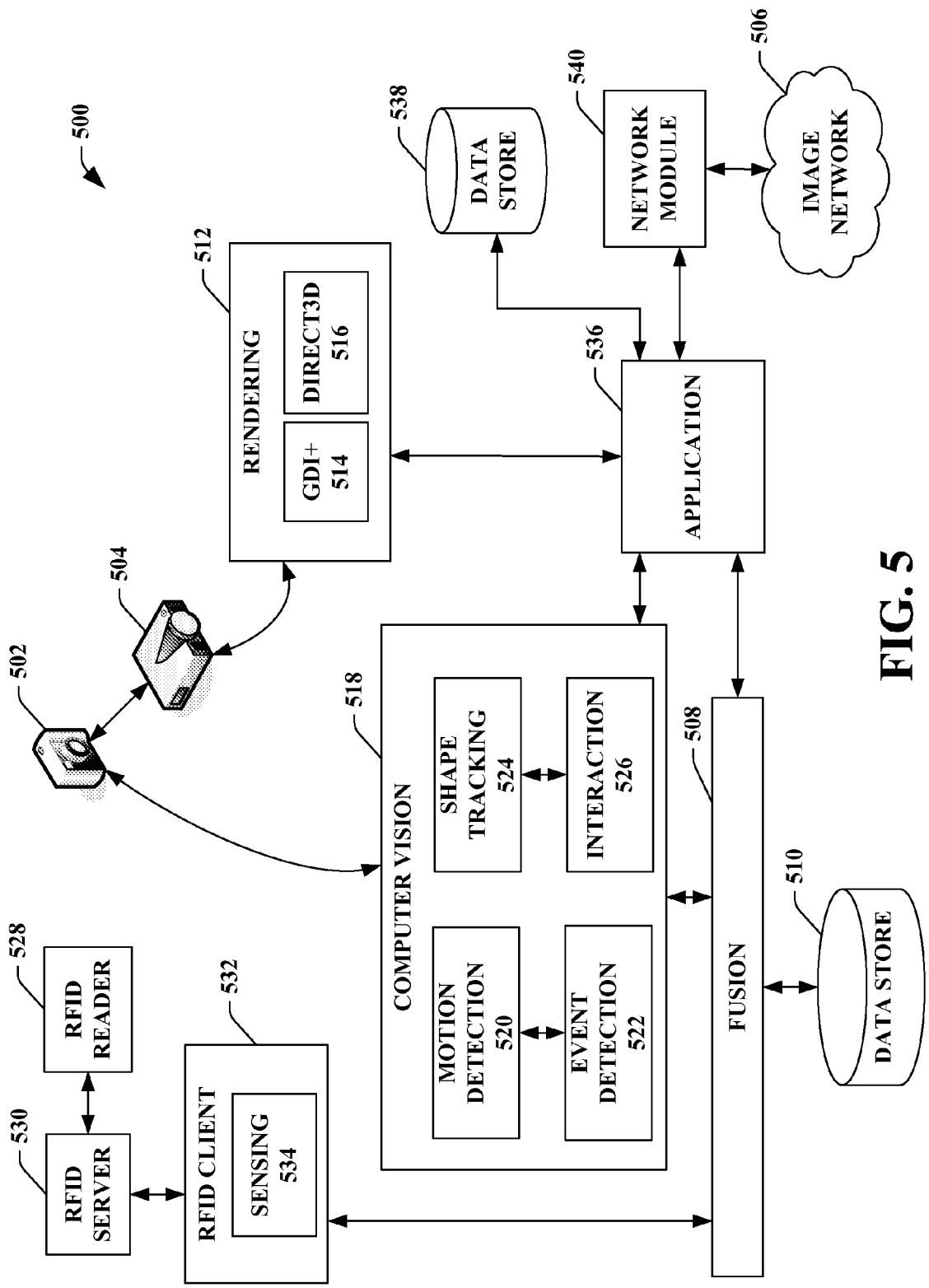
FIG. 5 illustrates a block diagram of exemplary system that facilitates enhancing surface computing by leveraging Radio Frequency Identification (RFID) tags associated with objects.

FIG. 5 illustrates a system 500 that facilitates enhancing surface computing by leveraging Radio Frequency Identification (RFID) tags associated with objects. The system 500 can include a rear-projected setup (e.g., a camera 502, a projector 504, etc.) for implementation of a fusion framework for continuous tracking and touch screen interaction. It is to be appreciated that the system 500 is but one example of numerous configurations, components, etc. in order to implement the subject innovation. In general, imagery can be received via an image network 506 and projected in connection with objects as they are detected or placed on a surface (e.g., table top, etc.). In another example, an image of interest can be copied by placing an item on the surface and dragging such image to such item. Based on such example, the item, upon placement on the surface, can be associated with such image and the image can be displayed upon detection of such item.

The system 500 can detect an object utilizing a vision-based activity sensing technique including the camera 502, the projector 504, and a rendering module 512. The rendering module 512 can include GDI+ 514 (or other 2D rendering approaches) and/or direct3D 514 (or other 3D rendering techniques, such as OpenGL, etc.). The vision-based activity sensing from the camera 502 and/or the project 504 can be leveraged by the computer vision module 518. The computer vision module 518 can include a motion detection module 520, an event detection module 522, a shape tracking module 524, and an interaction module 526. Moreover, the system 500 can include an RFID reader 528 that can receive a portion of RFID data from an object on a surface, in which such object is detected by a vision-based activity sensing technique. The RFID reader 528 can interact with an RFID server 530 in order to communicate such RFID data to an RFID client 532 (e.g., the RFID client 532 can include a sensing module 534). As discussed below, the fusion module 508 can leverage the RFID data in order to identify event data in a data store 51 0. The system 500 can further include an application 536 that can leverage at least one of a data store 538 (e.g., a file system, etc.), the network module 540, the image network 506, the computer vision module 518, and/or the rendering module 512.

When a new object is detected by a fusion module (e.g., fusion 508, RFID fusion component (not shown), etc.), a lookup in a data store 510 (e.g., object database, data store that includes information about object type, etc.) can be performed. For instance, there can be any suitable number or types of tagged objects such as, but not limited to, query object, container object, operator object, etc. A query object can use a pre-stored parameter value such as associated keywords. When a query object is detected on the surface, the keywords can be retrieved from the data store 510 and used in a search on the image network 506 (e.g., online data store, network, website, etc.) via a network module 538. Matching images can be utilized to appear around the detected object on the surface. Users can interact with such images by changing size and moving them, as well as dragging them to other objects on the surface. A container object can act as a physical handle to a collection of images (e.g., digital images). Such a container object can also be used as a symbolic link to a physical storage, such as, but not limited to, a shared network folder, a data store, a website, a network, a device, a camera, a hard drive, a universal serial bus (USB) drive, a component, etc. For example, a container object representative of a network drive can present data (e.g., images, files, etc.) currently stored on such network drive. Moreover, data can be dragged to such container object in order to initiate a copy of such data to the represented physical storage. Moreover, an operator object can execute a specific function on a dropped image or upon activation (e.g., dropping an image on the detected surface input, etc.). For instance, an ashtray can represent a trashcan or recycle bin which can collect deleted data. Thus, an image or object moved to such ashtray can be deleted.

In one example, the system 500 can support more complex queries, wherein a mechanism for authoring tags and keywords can be employed. Moreover, more operators can be utilized. It is to be appreciated that any suitable operation related to surface computing and/or data interaction can be implemented with the subject innovation. In accordance with another aspect of the subject innovation, data (e.g., photos, images, etc.) can be transferred directly from a portable device such, but not limited to, a digital camera or a camera phone. For instance, new data (e.g., photos) can spill out onto the surface when the camera is placed on it, and associated to other objects (e.g., assigning tags to the photo, etc.), or deleted. In still another example, a tabletop slideshow can be implemented, wherein such slideshow can be controlled by the configuration of the objects placed on the surface. For instance, an order of images can be automatically utilized for a slideshow in such order. Moreover, the relative position of the various objects on the surface can be used to build a database query, where a discrete control with 2D parameter space can be extended.

There are many ways in which the digital surface can be used as a platform for extending and augmenting physical objects leveraging a display and/or interaction through a multi-touch sensitive surface. For example, editing data (e.g., documents, pictures, etc.) on a device can be mitigated by extended the interface to the surface. Linked service manuals that dynamically visualize the functionality associated with parts on a camera is another example.

It is to be appreciated that the fusion technique implemented by the subject innovation is not to be limited to RFID and/or vision modalities. For example, RFID and computer vision techniques can be complimented with additional sensing modalities. For example, RFID components can provide information related to orientation or the location of an RFID tag. For instance an RFID reader that provides detection of signal strength can enable a more sophisticated reasoning about sensed objects on the surface. Moreover, higher read rates can be implemented to improve overall system performance and interactivity. Furthermore, the ability to transmit and receive on the same antenna can allow twice the number of read points, increase sensing range and simplify antenna design.

A set of features can be utilized by the subject innovation in order to determine or extract data about objects within the system. Signal strength can be used as a coarse indication of a distance, wherein such calculation can be refined by subsequent fusion with other modalities, or for detecting interaction with the tagged object. Yet, signal strength can be approximated with a response rate (e.g., the number of successful responses divided by the number of attempted polls). Some RFID readers can provide software control over gain attenuation at runtime. A radar-like functionality can be achieved by increasing the energy over a number of reads. Depending on the available data, multiple antennas and readers can be utilized with varying position, orientation, gain and/or other parameters in order to extract more information about the RFID tags being read. For example, signal strength from multiple antennas can be used for coarse position triangulation of an RFID tag.

The claimed subject matter can exploit various RFID tag properties. For example, various properties such as, but not limited to, occlusion, tag geometry, orientation, etc. can affect how much energy the RFID tag can absorb and reflect through backscattered energy. This could bring additional factors to help the fusion process. Tag antenna design can provide insight on how well the tag absorbs and reflects energy. Besides using different designs, the performance can be modified by cutting off a portion of the antenna (e.g., half of the antenna, etc.). This can limit the reading range of certain tags. In another example, multiple tags with varying geometry can be placed on an object, wherein the resulting variation in sensitivity can be an indication of signal strength. Tag geometry can also relate to detection performance as it varies with orientation. Tag detection can be less reliable when the (e.g., flat) tags are oriented perpendicular towards the antenna, rather than face-on. Elongated tags may not be as robustly read as symmetrical tags with a 90 degree orientation when used with a wire-loop antenna. Multiple orientation-sensitive tags on an object can both increase robustness and provide an indication of orientation. Sensing can degrade in the presence of liquids or metal. Given that the human body is largely composed of water, a tag can be blocked from being read by occluding it with a hand. By tracking the hand in the camera image, motion with the varying readability of the blocked tags can be correlated, such that the tags will also act as sensors. The on-board memory on RFID tags can be utilized for storing the identification number and other data. By having a passive tag with general purpose on-board storage, the recognition process can be aided. For instance, the interactive surface can update the object's tag with detected tracking features as it learns new properties about the object. Instead of storing the object features in a central repository (e.g., data store), information can be directly stored with the object itself. For example, information, such as shape, size and color, can provide valuable information to the fusion framework, such that objects could be more robustly disambiguated on the surface.

The claimed subject matter takes advantage of each modality's strength; the surface detection component (not shown) can monitor the camera image for activities of interest, while the RFID fusion component (not shown) can monitor the RF domain to sense tags. The fusion of these complementary sensors allows the use of an RFID reader and robust vision techniques. The Frame Difference Algebra (FDA), for example, can be widely applicable. Likewise, the use of RFID equipment can allow the identification of multiple physical objects of any type, using RFID tags.

Figure 6:
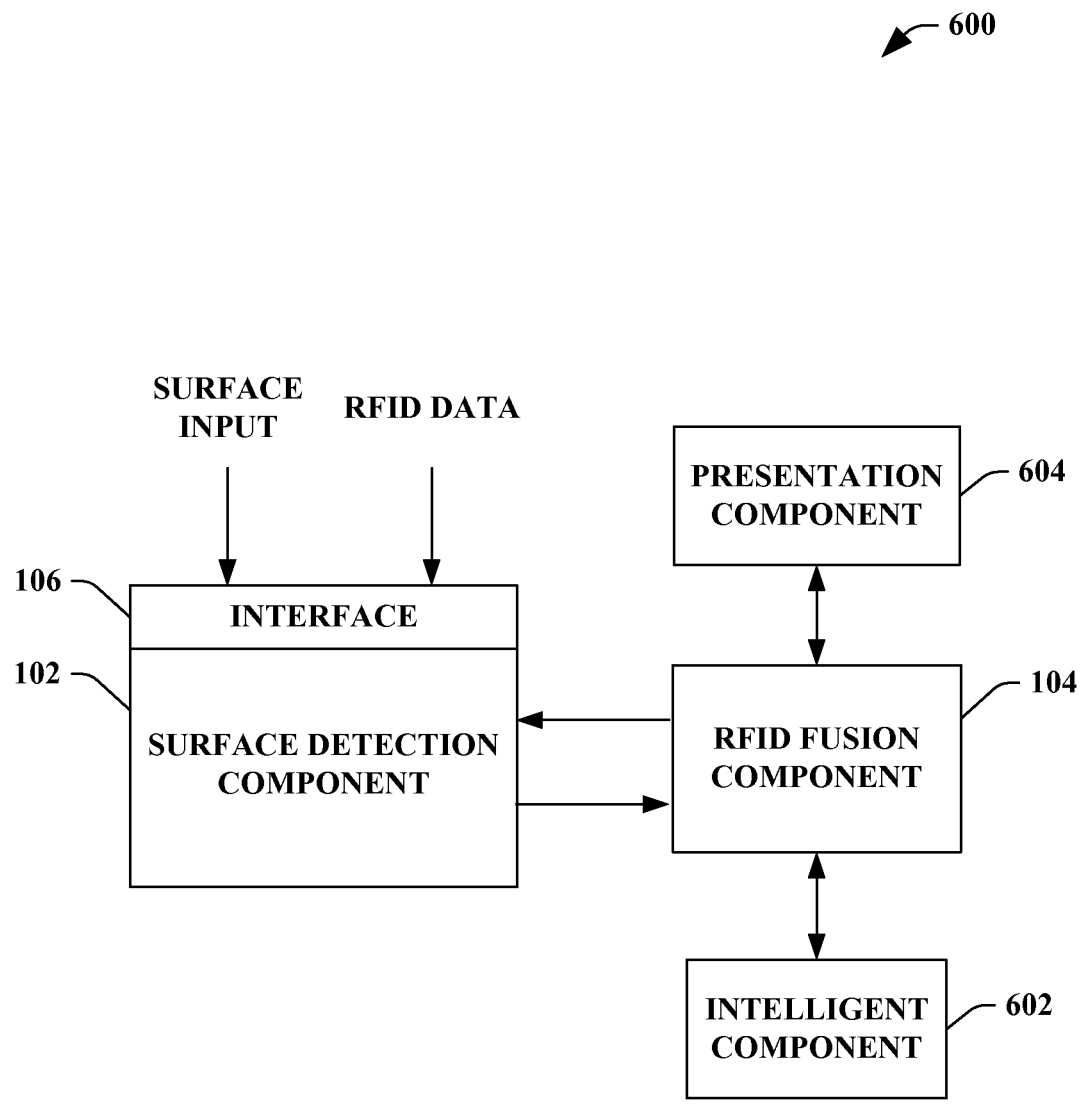
FIG. 6 illustrates a block diagram of an exemplary system that facilitates automatically gleaning Radio Frequency Identification (RFID) data for identification of objects within a surface detection environment.

FIG. 6 illustrates a system 600 that employs intelligence to facilitate automatically gleaning Radio Frequency Identification (RFID) data for identification of objects within a surface detection environment. The system 600 can include the surface detection component 102, the RFID fusion component 104, the interface 106, the surface input, and the portion of RFID data which can be substantially similar to respective components, interfaces, surface inputs, and portions of RFID data described in previous figures. The system 600 further includes an intelligent component 602. The intelligent component 602 can be utilized by the RFID fusion component 104 and/or the surface detection component 102 to facilitate activity sensing in relation to surface input detection and/or surface input identification. For example, the intelligent component 602 can infer RFID data, object detection, data to be associated with an object, position of an object, location of an object, shape of an object, surface input characteristics, tagged object type, FDA data, real time tracking data, image network information, query data, etc.

The intelligent component 602 can employ value of information (VOI) computation in order to identify data to associate with a detected object. For instance, by utilizing VOI computation, the most ideal and/or appropriate data (e.g., imagery, digital photo, tagged object type, etc.) to relate to a detected object can be identified. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The RFID fusion component 104 can further utilize a presentation component 604 that provides various types of user interfaces to facilitate interaction between a user and any component coupled to the RFID fusion component 104. As depicted, the presentation component 604 is a separate entity that can be utilized with the RFID fusion component 104. However, it is to be appreciated that the presentation component 604 and/or similar view components can be incorporated into the RFID fusion component 104 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the RFID fusion component 104.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
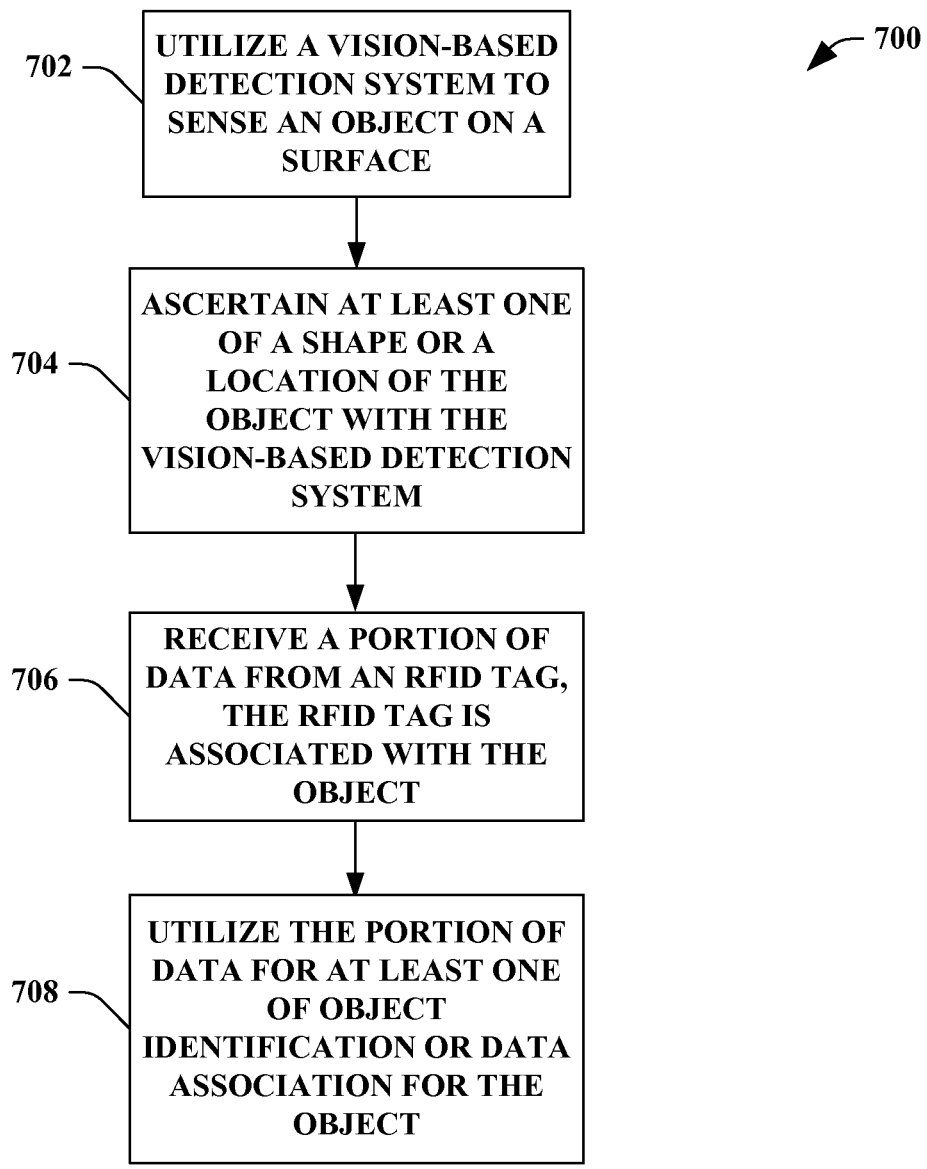
FIG. 7 illustrates an exemplary methodology for leveraging Radio Frequency Identification (RFID) technology in order to enhance object detection associated with interactive surfaces, surface computing, and/or interactive displays.
Figure 8:
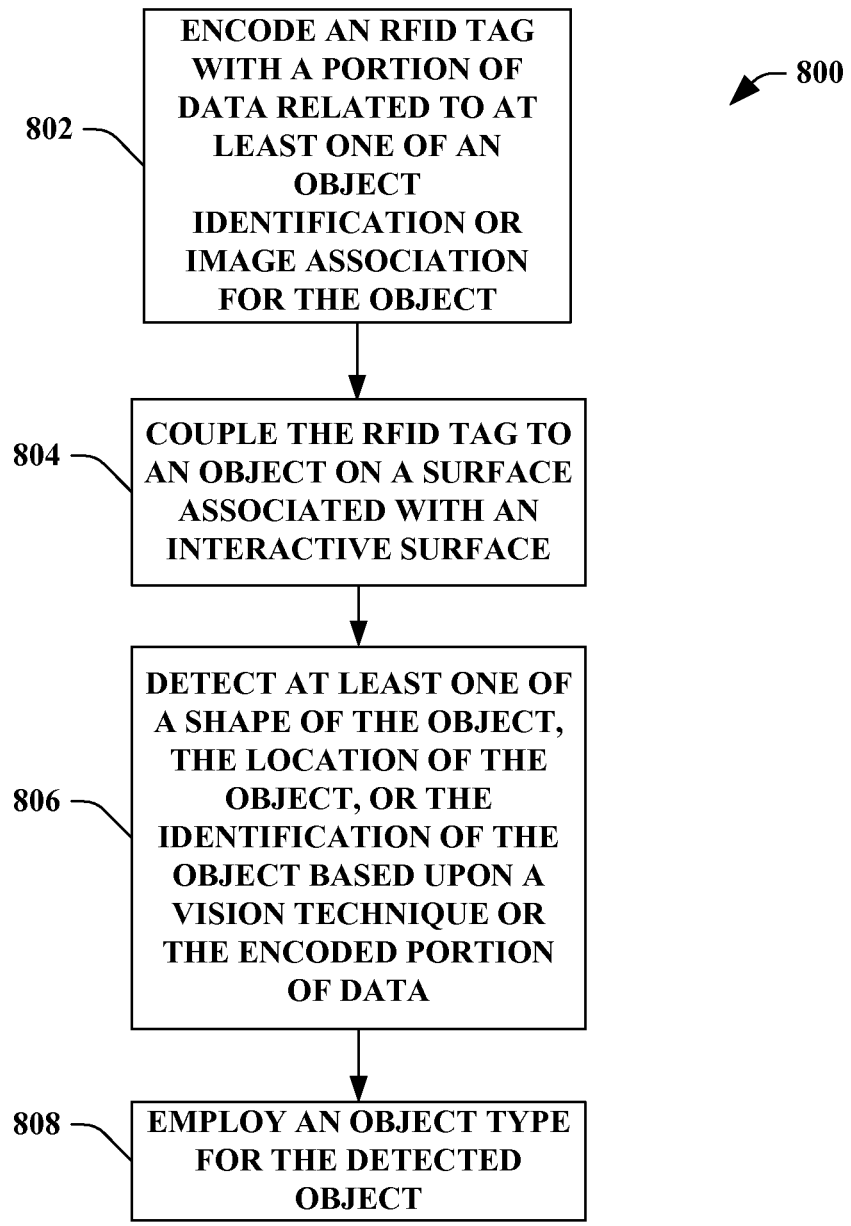
FIG. 8 illustrates an exemplary methodology that facilitates utilizing Radio Frequency Identification (RFID) tags for identification of objects in connection with vision-based activity sensing.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates leveraging Radio Frequency Identification (RFID) technology in order to enhance object detection associated with interactive surfaces, surface computing, and/or interactive displays. At reference numeral 702, a vision-based detection system can be utilized to sense an object on a surface. For example, the object can be a corporeal object or a portion of a user (e.g., hand, finger, palm, etc.) on an interactive table top and/or any other suitable data interface that enables physical data interaction.

At reference numeral 704, at least one of a shape or a location of the object can be ascertained with the vision-based detection system. For example, vision-based techniques can be utilized to identify the location of the surface input (e.g., the object on the surface, etc.) and/or the shape of the surface input. At reference numeral 706, a portion of data from a Radio Frequency Identification (RFID) tag can be received, wherein the RFID tag can be associated with the object. For example, the RFID tag can include a portion of data and can be coupled (e.g., connected, integrated, embedded, placed upon, connected via adhesive, etc.) to an object. Such RFID tag can transmit and/or communicate such portion of data. At reference numeral 708, the portion of data can be utilized for at least one of object identification or data association of the object (e.g., link data to the object, utilize an image for the displayed object, etc.).

FIG. 8 illustrates a method 800 for utilizing Radio Frequency Identification (RFID) tags for identification of objects in connection with vision-based activity sensing. At reference numeral 802, an RFID tag can be encoded with a portion of data related to at least one of object identification or image association for the object. For instance, the RFID tag can be encoded with a portion of data that can identify an object (e.g., the object is a cube, the object is a license, the object is a speaker, the object is an ashtray, the object is a pen, etc.). In another example, the RFID tag can be encoded with a portion of data that can associate an image or photo to the detected object (e.g., a license can be detected and an image of a license can be displayed, an ashtray can be detected and text can be displayed describing associated functionality such as "trash," a speaker can be detected and a graphic of an analog knob can be displayed, etc.).

At reference numeral 804, the RFID tag can be coupled to an object on a surface associated with an interactive surface. For example, any suitable interactive surface (e.g., interactive table system, tangible user interface, etc.) can detect the object and/or the RFID tag on the surface. Moreover, the RFID tag can be associated with the object (e.g., coupled, integrated, incorporated, connected, placed on a surface of the object, etc.).

At reference numeral 806, at least one of a shape of the object, the location of the object, of the identification of the object can be detected based upon at least one of a vision technique or leveraging the encoded portion of data on the RFID tag. For example, the RFID tag can include a portion of data that provides at least one of the shape of the object, the location of the object, or the identification of the object. In another example, the vision technique can be employed to identify at least one of the shape of the object, the location of the object, or the identification of the object. In still another example, the vision technique in combination of the portion of data encoded on the RFID tag can be utilized to ascertain at least one of the shape of the object, the location of the object, or the identification of the object.

At reference numeral 808, an object type can be employed for the detected object. For example, the object type can be defined as at least one of a query object (e.g., pre-stored parameter values such as associated keywords assigned to the object), a container object (e.g., object that can represent a physical handle to a collection of data), or an operator object (e.g., object that can be linked to execute a function).

Figure 9:
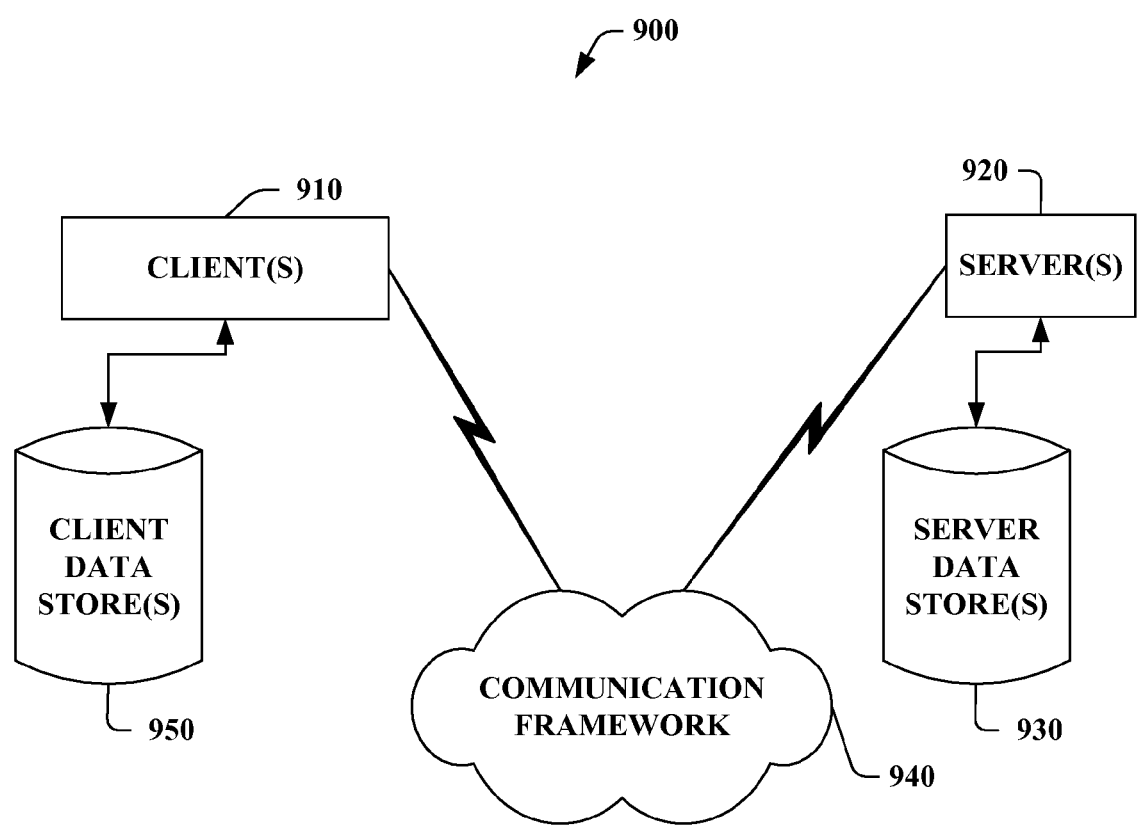
FIG. 9 illustrates an exemplary networking environment, wherein the novel aspects of the claimed subject matter can be employed.
Figure 10:
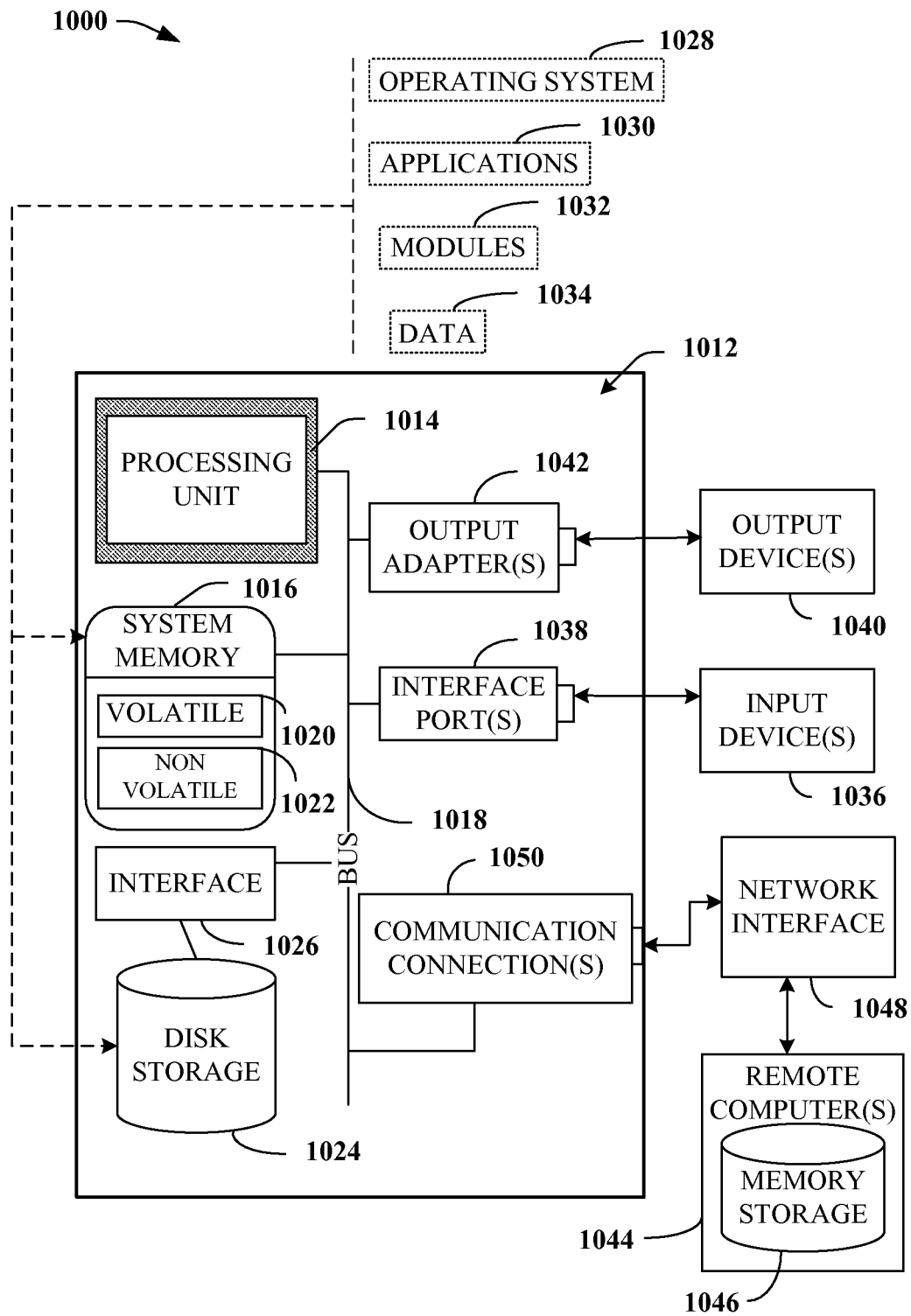
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, an RFID fusion component that leverages RFID data from an RFID tag in order to facilitate object identification, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 9 10. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that facilitates detecting and identifying objects within surface computing, comprising:
    an interface component that captures a surface input of a source on a surface, the source comprising a Radio Frequency Identification (RFID) tag and one or more of an object, a gesture, and a portion of a user;
    a surface detection component that:
    detects a location of the surface input utilizing a computer vision-based sensing technique or a non-RFID localization technique, and associates a vision time stamp to at least one of addition, removal, or movement of the surface input; and
    a Radio Frequency Identification (RFID) fusion component that: associates an RFID time stamp to a detection of the RFID tag,
    receives a portion of RFID data from the RFID tag of the source of the surface input, and
    utilizes the portion of RFID data to identify the source of the surface input and a portion of data to associate to the surface input, wherein at least one of the vision time stamp and the RFID time stamp are matched based at least in part upon a correlation in time, the correlation relates to closeness in detection times for the RFID time stamp and the vision time stamp.

2. The system of claim 1, further comprising an RFID component that receives, translates, and communicates the portion of RFID data to the RFID fusion component, the RFID component comprises one or more of: an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system.

3. The system of claim 1, wherein the surface detection component utilizes a Frame Difference Algebra (FDA) to detect a change between a first still frame and a second still frame.

4. The system of claim 3, wherein the FDA comprises a set of image processing operations in which the at least one of addition, removal, or movement of the surface input is detected.

5. The system of claim 1, further comprising a real time tracking component that employs a frame-to-frame correspondence tracking for the surface input between a previous frame and a subsequent frame, the surface input detected being tagged with an identification (ID).

6. The system of claim 5, wherein the real time tracking component ascertains the frame-to-frame correspondence by one or more of: computing a time-based correlation and computing a distance of the surface input to a disparate surface input, wherein a shape in the subsequent frame inherits the ID of a closest shape in the previous frame.

7. The system of claim 1, further comprising an image network that provides the portion of data to associate with the surface input identified based upon the portion of RFID data received from the RFID tag.

8. The system of claim 7, the portion of data is at least one of an image, a photo, a portion of audio, a portion of video, a portion of a graphic, a portion of text, or a function.

9. The system of claim 1, wherein the RFID data defines the surface input as an object comprising:
    a query object, the query object being a detected surface input associated with a keyword;
    a container object, the container object being a detected surface input that is a physical handle to a collection of data; or
    an operator object, the operator object being a detected surface input that executes a function upon activation.

10. A computer-implemented method comprising:
    under control of one or more processors configured with executable instructions:
    sensing an object, comprising a Radio Frequency Identification (RFID) tag, on a surface utilizing a vision-based detection system;
    ascertaining a shape or a location of the object utilizing the vision-based detection system;
    receiving a portion of data from the RFID tag of the object, the received portion of data describing a functionality or an identity associated with the object; and
    displaying the received portion of data on the surface on which the object is sensed, wherein the received portion of data from the RFID tag defines a surface input of the object as an object type comprising:
    a query object, the query object being a detected surface input associated with a keyword;
    a container object, the container object being a detected surface input that is a physical handle to a collection of data; or
    an operator object, the operator object being a detected surface input that executes a function upon activation.

11. The method of claim 10, further comprising utilizing the received portion of data to detect the shape of the object or the location of the object on the surface.

12. A computer-implemented method comprising:
    under control of one or more processors configured with executable instructions:
    detecting a corporeal object, comprising a Radio Frequency Identification (RFID) tag, on a surface;

in response to detecting the corporeal object on the surface, receiving RFID data from the RFID tag of the detected corporeal object; and displaying a portion of the received RFID data on the surface, wherein the received RFID data defines a surface input of the detected corporeal object as an object type comprising:

a query object, the query object being a detected surface input associated with a keyword;

a container object, the container object being a detected surface input that is a physical handle to a collection of data; or an operator object, the operator object being a detected surface input that executes a function upon activation.

13. The method of claim 12, wherein the surface input of the corporeal object comprises the query object associated with the keyword, and the method further comprises:

in response to detecting the corporeal object on the surface, retrieving the keyword from a data store;

obtaining an image based on the retrieved keyword; and displaying the obtained image around the detected corporeal object on the surface.

14. The method of claim 12, further comprising:

detecting a physical interaction between the detected corporeal object and a user;

manipulating the displayed portion of the received RFID data on the surface based on the detected physical interaction.

15. The method of claim 12, wherein the displayed portion of the received RFID data comprises an image of the corporeal object.

16. The method of claim 12, wherein the corporeal object further comprises at least one other RFID tag that has a different geometry or orientation from the RFID tag from which the RFID data is received, and wherein the method further comprises detecting an orientation of the corporeal object based on the at least one other RFID tag and the RFID tag from which the RFID data is received.

17. The method of claim 12, further comprising adding a time-stamped event in a data store in response to detecting an appearance or disappearance of the RFID tag of the corporeal object.

* * * * *